US012712894B2

(12) United States Patent
Young et al.

(10) Patent No.: US 12,712,894 B2
(45) Date of Patent: Aug. 18, 2026

(54) SYSTEM AND METHOD TO DYNAMICALLY GENERATE SYNTHETIC STRUCTURES IN A VIRTUAL ENVIRONMENT

(71) Applicant: Bank of America Corporation, Charlotte, NC (US)

(72) Inventors: Michael R Young, Davidson, NC (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 96 days.

(21) Appl. No.: 18/785,570

(22) Filed: Jul. 26, 2024

(65) Prior Publication Data

US 2026/0032130 A1 Jan. 29, 2026

(51) Int. Cl.
*H04L 9/40* (2022.01)

(52) U.S. Cl.
CPC .......... *H04L 63/1416* (2013.01); *H04L 63/30* (2013.01)

(58) Field of Classification Search
CPC ............................ H04L 63/1416; H04L 63/30
USPC ............................................................ 726/23
See application file for complete search history.

(56) References Cited

U.S. PATENT DOCUMENTS 10,200,262 B1 * 2/2019 Leverich ............. H04L 63/1425
10,977,379 B1 * 4/2021 Williams .............. G06F 21/604
11,082,434 B2 8/2021 Ravindra et al.
11,086,987 B2 8/2021 Brown
11,165,815 B2 11/2021 Trost et al.
11,277,423 B2 3/2022 Brown
11,316,902 B2 4/2022 Andrews et al.
2014/0250524 A1 * 9/2014 Meyers ................. G06F 21/554 726/22
2017/0134405 A1 * 5/2017 Ahmadzadeh ........ G06F 21/554
2020/0053123 A1 * 2/2020 Pliskin .................... H04L 63/10
2020/0210465 A1 * 7/2020 Upadhyay ............... G06F 40/53
2020/0327223 A1 10/2020 Sanchez et al.
2021/0168093 A1 6/2021 Andrews et al.
2022/0101326 A1 3/2022 Kim et al.
2022/0131877 A1 * 4/2022 Oest ...................... G06F 21/566
(Continued)

OTHER PUBLICATIONS

Michael R. Young, System and method to dynamically generate access triggers to a network, U.S. Appl. No. 18/785,514, filed Jul. 26, 2024, pp. 1-57.
(Continued)

*Primary Examiner* — Michael S McNally

(57) ABSTRACT

A system comprises a memory communicatively coupled to at least one processor. The at least one processor is configured to receive multiple tracked activities over a period of time and receive an access command from the entity. The processor is configured to execute the machine learning algorithm to determine an intent based on the tracked activities and the access command, generate a synthetic network structure based on the determined intent, generate a virtual environment configured to resemble one or more portions of the communication network, and place the synthetic network structure in the virtual environment. Further, the processor is configured to present, to the entity, access to the synthetic network structure in the virtual environment, and determine that the entity is associated with an electronic attacker over the period of time in response to determining that the entity performed the action in association with the synthetic network structure.

20 Claims, 7 Drawing Sheets

(56) References Cited

U.S. PATENT DOCUMENTS

| | | | |
|---|---|---|---|
| 2022/0210200 | A1 | 6/2022 | Crabtree et al. |
| 2022/0247678 | A1 | 8/2022 | Atwal et al. |
| 2022/0269491 | A1 | 8/2022 | Seetharaman et al. |
| 2022/0337557 | A1 | 10/2022 | Head et al. |
| 2023/0062655 | A1 | 3/2023 | Wan et al. |
| 2023/0370495 | A1 | 11/2023 | Desai et al. |
| 2024/0039954 | A1 | 2/2024 | Shete et al. |
| 2024/0129338 | A1 | 4/2024 | Azad et al. |
| 2024/0163312 | A1 | 5/2024 | Azad et al. |

OTHER PUBLICATIONS

Michael R. Young, System and method to evaluate entity operations across multiple virtual environments, U.S. Appl. No. 18/785,721, filed Jul. 26, 2024, pp. 1-68.

* cited by examiner

SYSTEM AND METHOD TO DYNAMICALLY GENERATE SYNTHETIC STRUCTURES IN A VIRTUAL ENVIRONMENT

TECHNICAL FIELD

The present disclosure relates generally to providing security operations, and more specifically to a system and method to dynamically generate synthetic structures in a virtual environment.

BACKGROUND

In communication systems, cyberattacks are more prevalent as cybersecurity becomes more dependent and influenced by emerging and disruptive technologies. Databases that store valuable, confidential, and sensitive information may be targets for cyberattacks. Recent data breaches have underscored growing sophistications of bad actors and complexities associated with managing databases in an increasingly connected world. In particular, bad actors may devise new ways to infiltrate entire databases and data eco-systems.

SUMMARY OF THE DISCLOSURE

In one or more embodiments, a system and method are configured to dynamically generate synthetic network structures in a virtual environment. In particular, the system may be configured to train a machine learning (ML) model to predict possible synthetic network structures to present to an entity in a communication network based on actions and/or operations performed by the entity in the communication network. The synthetic network structures may be one or more structures in the communication network generated to resemble network resources (e.g., databases, electronic device interfaces) of the communication network. The entities may be users and/or bad actors attempting to access databases in the communication network. In this regard, multiple network resources may be configured to store sensitive data associated with personnel and/or users. In some embodiments, the actions and/or operations may be evaluated by one or more ML algorithms in accordance with the ML models. The ML models may be trained to understand and/or predict operations associated with a specific entity in the communication network. The system may be configured to generate synthetic network structures that resemble network resources that the entity is expected to attempt to access. The system may be configured to present the synthetic network structures to the entity in the communication network and determine whether the entity interacted with one or more of the synthetic network structures. In some embodiments, the system may be configured to determine that the entity is associated with a user device if the entity does not interact with any synthetic structures. In other embodiments, the system may be configured to determine that the entity is associated with an electronic device if the entity interacts with any synthetic structures. Further, in response to determining that the entity is associated with an electronic attacker (e.g., bad actors), the system may be configured to transition the entity to a virtual environment where the entity may be allowed to operate freely and/or with minimal restraint. The virtual environment may be a sandbox environment partitioned and isolated from the rest of the communication network. In this regard, the entity may be removed from accessing and/or attempting to access network resources from structures in the rest of communication network.

In one or more embodiments, the system described herein are integrated into a practical application to improve security in a communication network by determining whether entities performing one or more actions in the communication network are associated with user devices or electronic attackers. In particular, the system may be configured to execute an ML algorithm that causes the system to analyze communication feedback received from the entities in the communication network, determine whether the communication feedback comprises suspicious activity performed by the one or more entities, and isolate the one or more entities performing suspicious activity in a virtual environment that is isolated from the rest of the communication network. The system may be configured to generate dynamic triggers and synthetic network structures, associate the dynamic triggers with synthetic network structures, place these structures in the communication network, determine whether the entities in the communication network interacted with the synthetic network structures based on reception of the dynamic triggers, and immediately isolate any suspicious entities in a virtual environment. The system may be configured to determine that the communication feedback comprises suspicious activity if the triggers are received within predefined time durations. Further, the entities determined to perform suspicious activity may be forced into the virtual environments where these entities are unable to access network resources from the rest of the communication network.

In one or more embodiments, the system is directed to improvements in computer systems. Specifically, the system reduce processor and memory usage in servers and/or user devices by quickly identifying bad actors from legitimate users attempting to access network resources in a communication network. As entities are determined to be bad actors based on their actions in the network, the system is configured to filter these bad actors from accessing some or all network resources and/or sensitive information in the network. Herein, processing and memory usage is reduced because processing and memory resources are not made available to all entities attempting to access the network. Instead, the system filters out bad actors and the processing and memory resources are made accessible to entities determined to be legitimate users. Further, the system is configured to prevent resources from being wasted retrieving data and/or restoring sensitive information in the communication network. In this regard, the system inhibits tracking of possible adverse impacts that bad actors could have caused in the network were the bad actors to reach sensitive information and/or network resources. As a result, workforce hours, processing resources, memory resources, and/or power resources are not spent retroactively tracking the actions of bad actors in the communication network.

In one or more embodiments, the system may comprise an apparatus, such as the server. Further, the system may be a data exchange system, that comprises the apparatus. In addition, the system may be configured to perform operations as part of a process performed by the apparatus. As a non-limiting example, the system may comprise a memory and at least one processor communicatively coupled to one another. The memory may be operable to store a machine learning algorithm configured, when executed, to evaluate data in accordance with one or more machine learning models. The at least one processor may be configured to receive multiple tracked activities comprising one or more actions performed by an entity in a communication network over a period of time and receive an access command from the entity to access multiple network resources in the communication network. The processor may be configured to execute the machine learning algorithm to determine a determined intent based on the tracked activities and the access command, generate a synthetic network structure based on the determined intent, generate a virtual environment configured to resemble one or more portions of the communication network and place the synthetic network structure in the virtual environment. The synthetic network structure may comprise multiple synthetic elements configured to resemble the network resources. The virtual environment may be an isolated partition of the communication network. Further, the processor may be configured to present, to the entity, access to the synthetic network structure in the virtual environment, determine whether the entity performed an action in association with the synthetic network structure, determine that the entity is associated with an electronic attacker over the period of time in response to determining that the entity performed the action in association with the synthetic network structure, generate a report comprising that the entity is associated with the electronic attacker over the period of time, and train the one or more machine learning models using the report.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
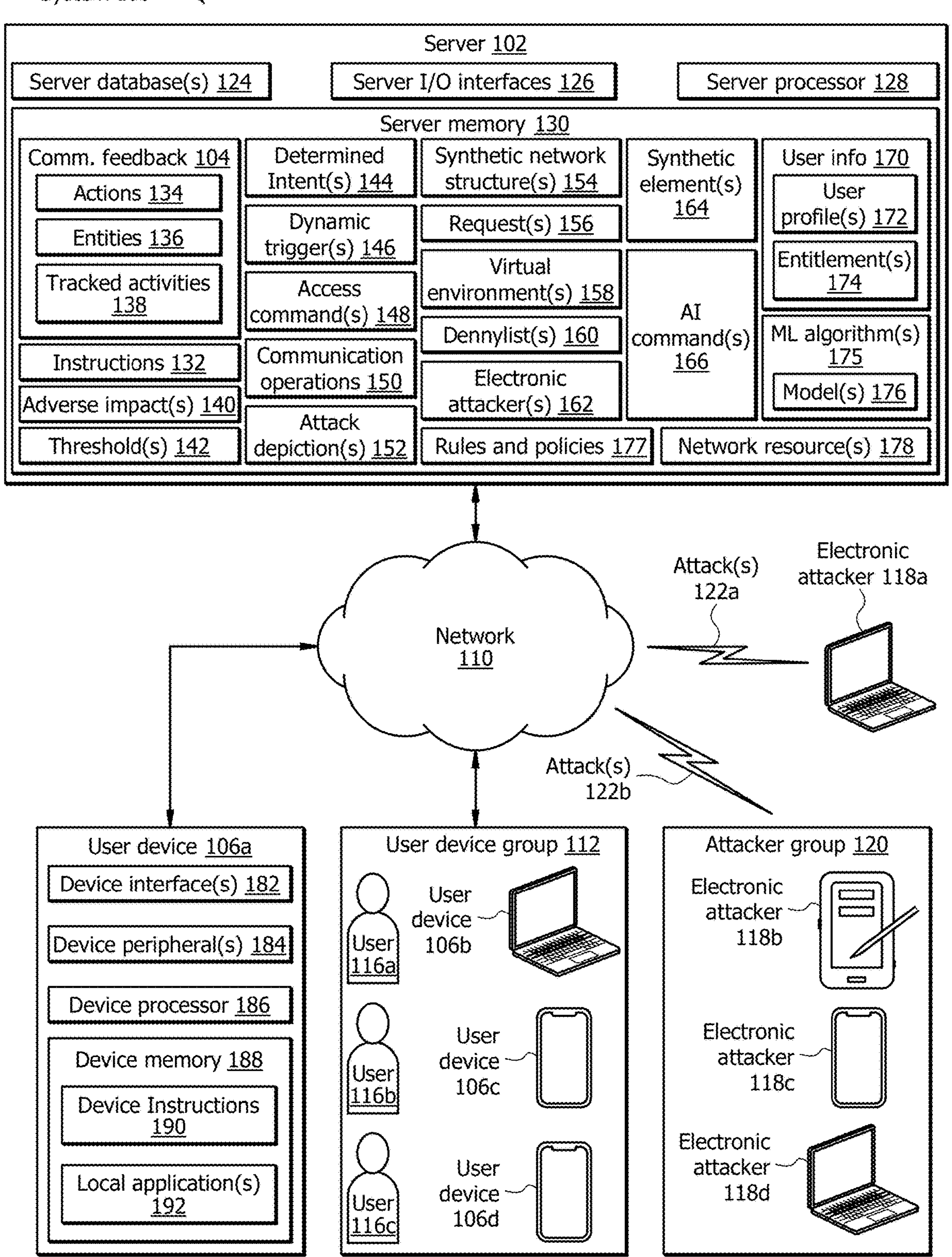
FIG. 1 illustrates a system in accordance with one or more embodiments.
Figure 2:
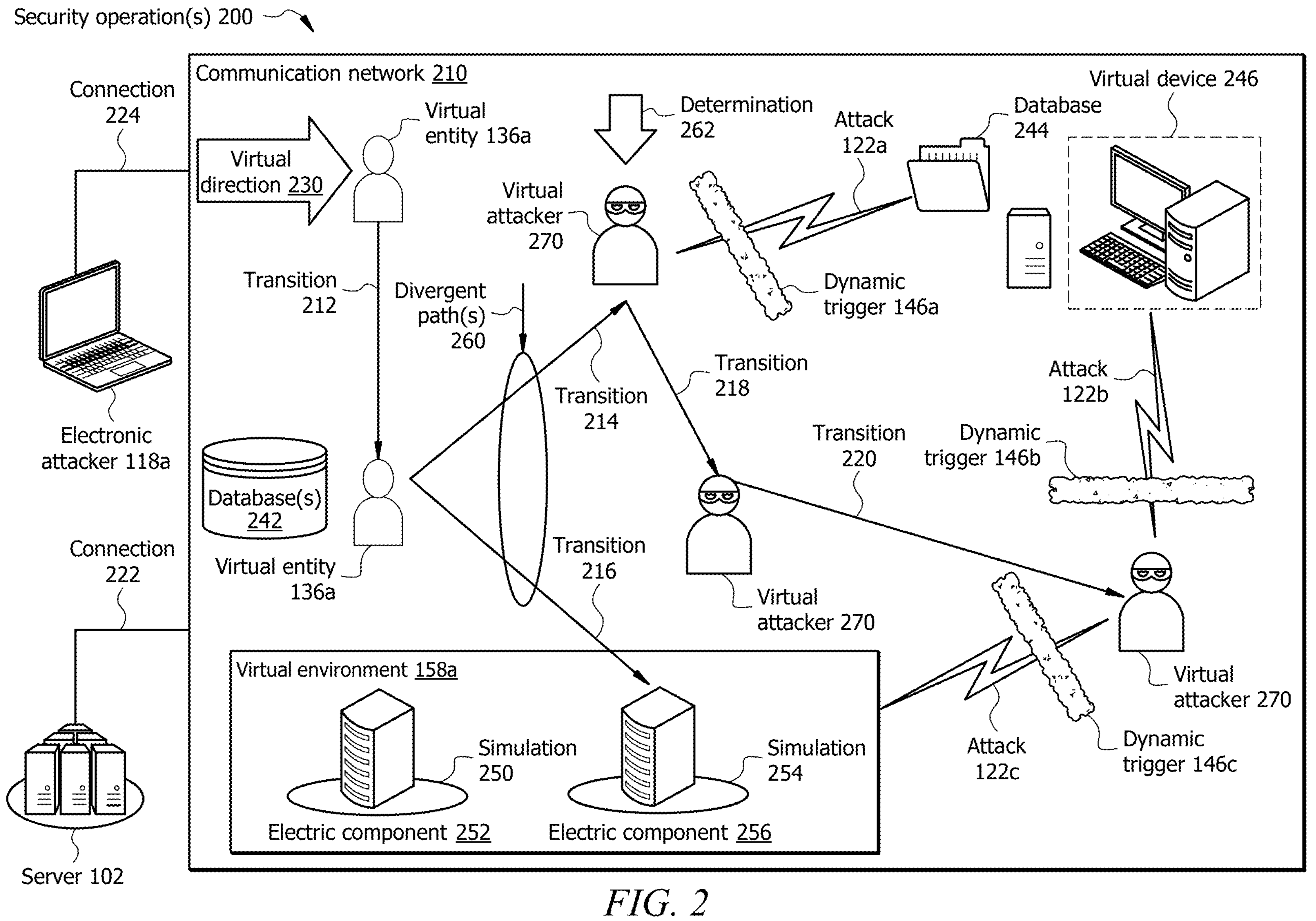
FIG. 2 illustrates multiple security operations configured to dynamically generate access triggers to a network in accordance with one or more embodiments.
Figure 3:
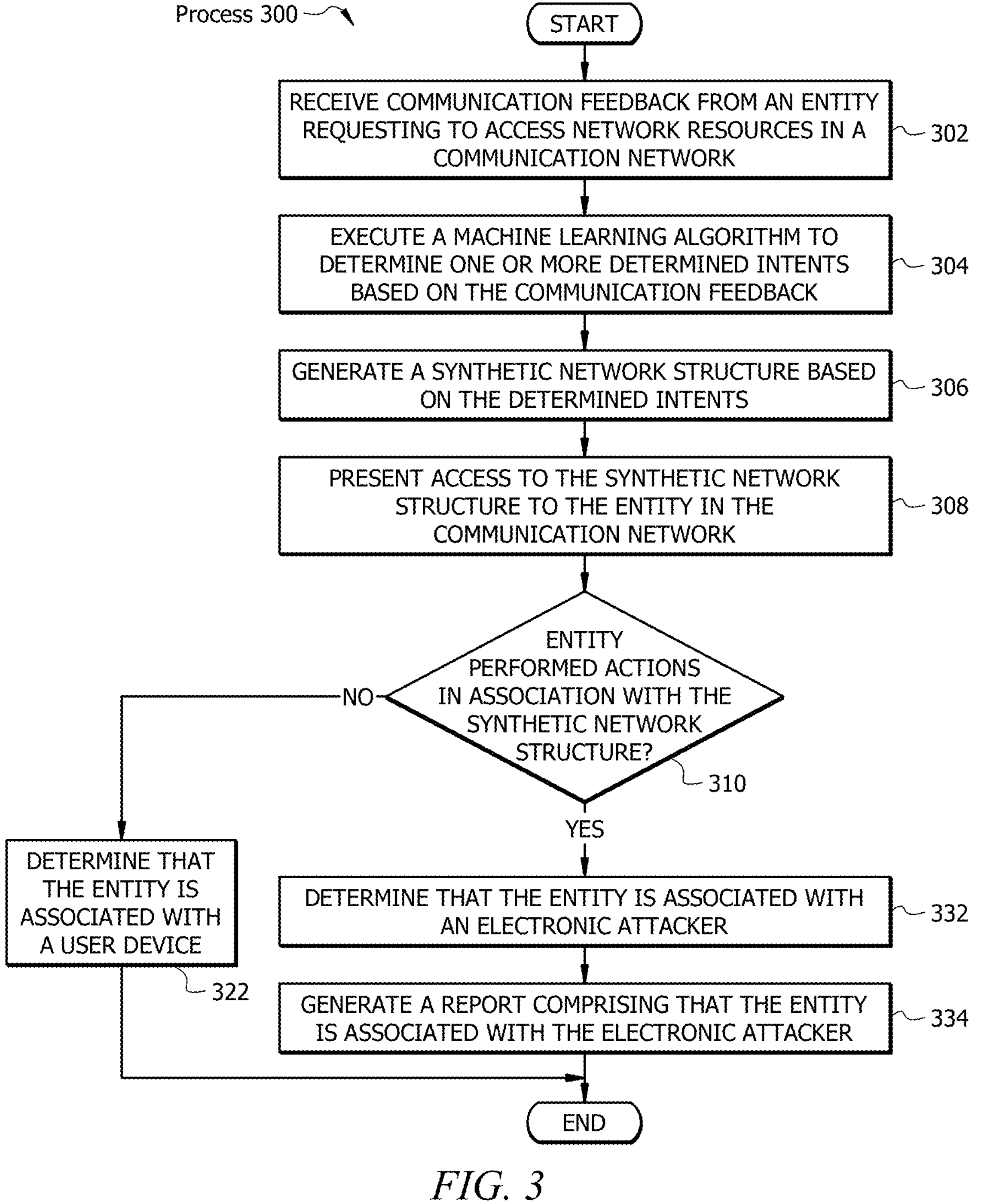
FIG. 3 illustrates an example flowchart of a method to perform the security operations of FIG. 2 in accordance with one or more embodiments.
Figure 4:
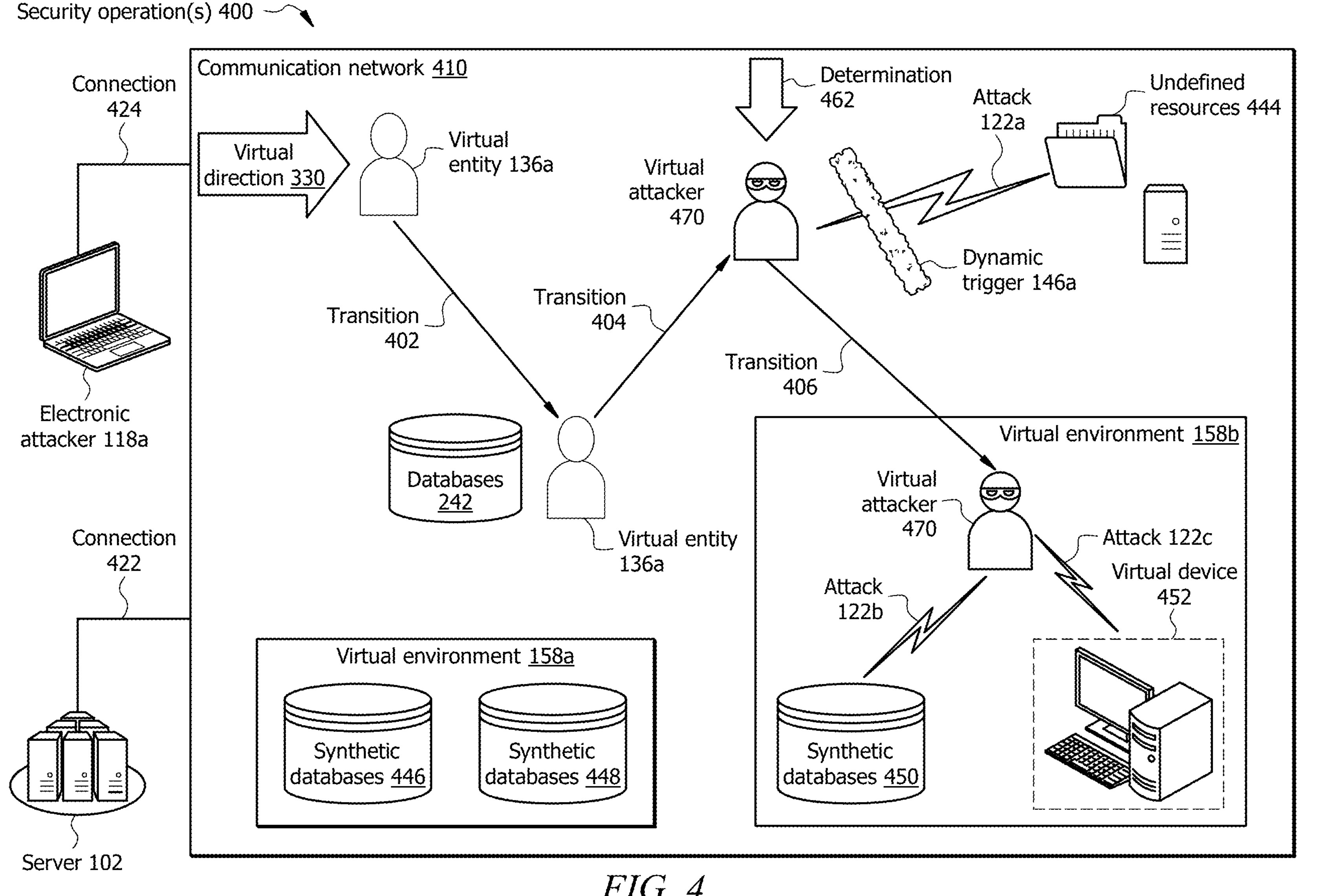
FIG. 4 illustrates multiple security operations configured to dynamically generate synthetic structures in a virtual environment in accordance with one or more embodiments.
Figure 5:
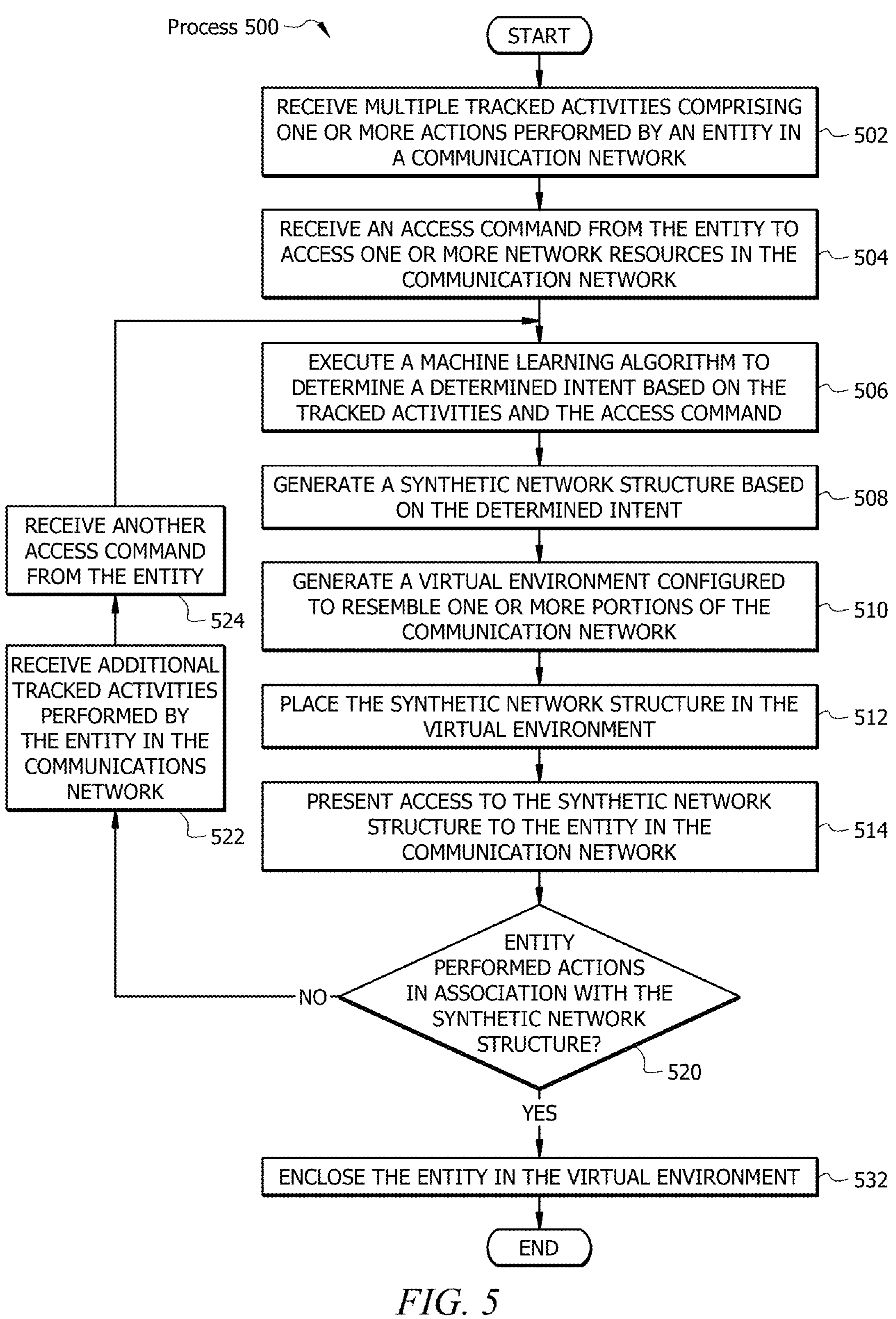
FIG. 5 illustrates an example flowchart of a method to perform the security operations of FIG. 4 in accordance with one or more embodiments.
Figure 6:
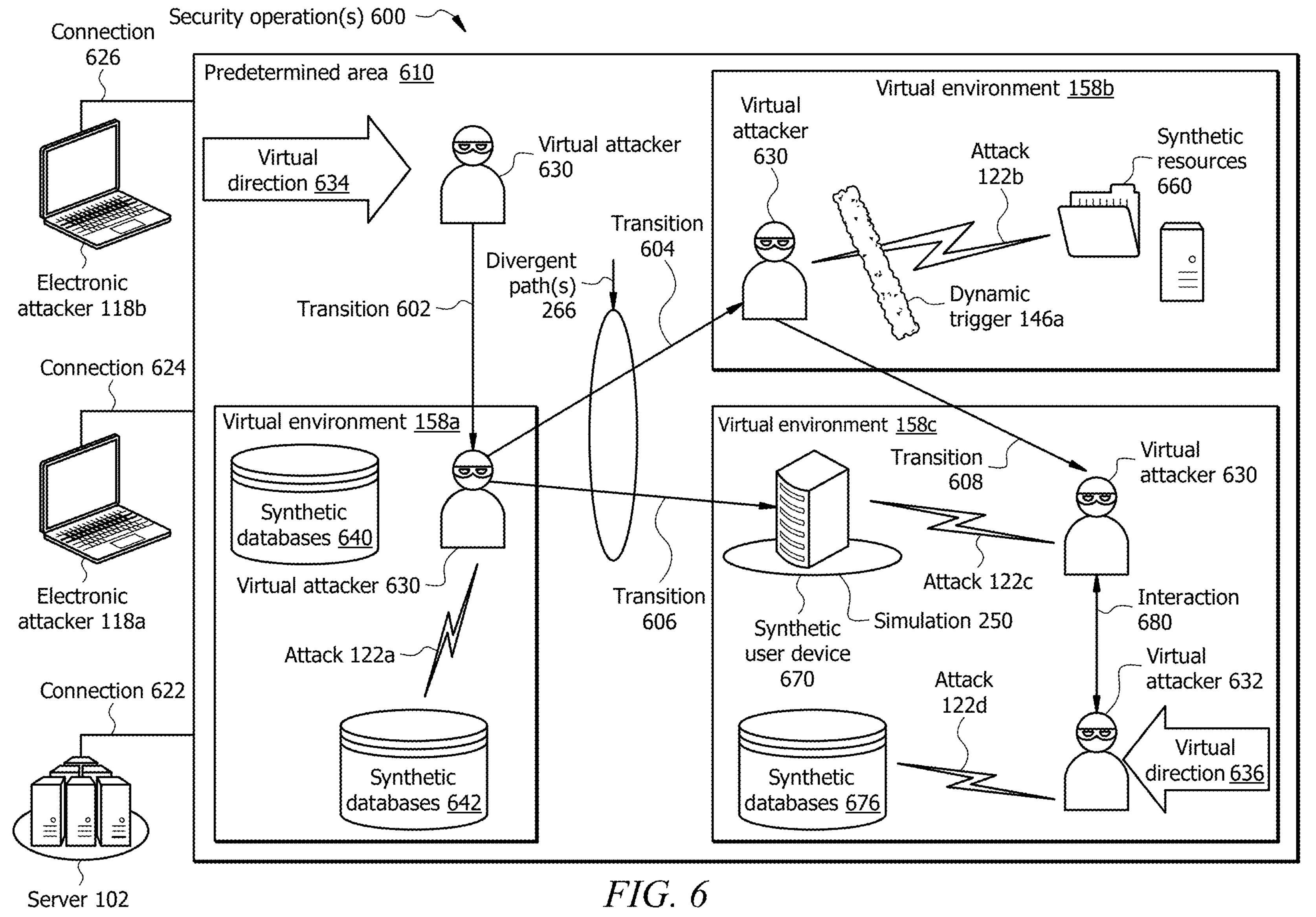
FIG. 6 illustrates multiple security operations configured to evaluate entity operations across multiple virtual environments in accordance with one or more embodiments.
Figure 7:
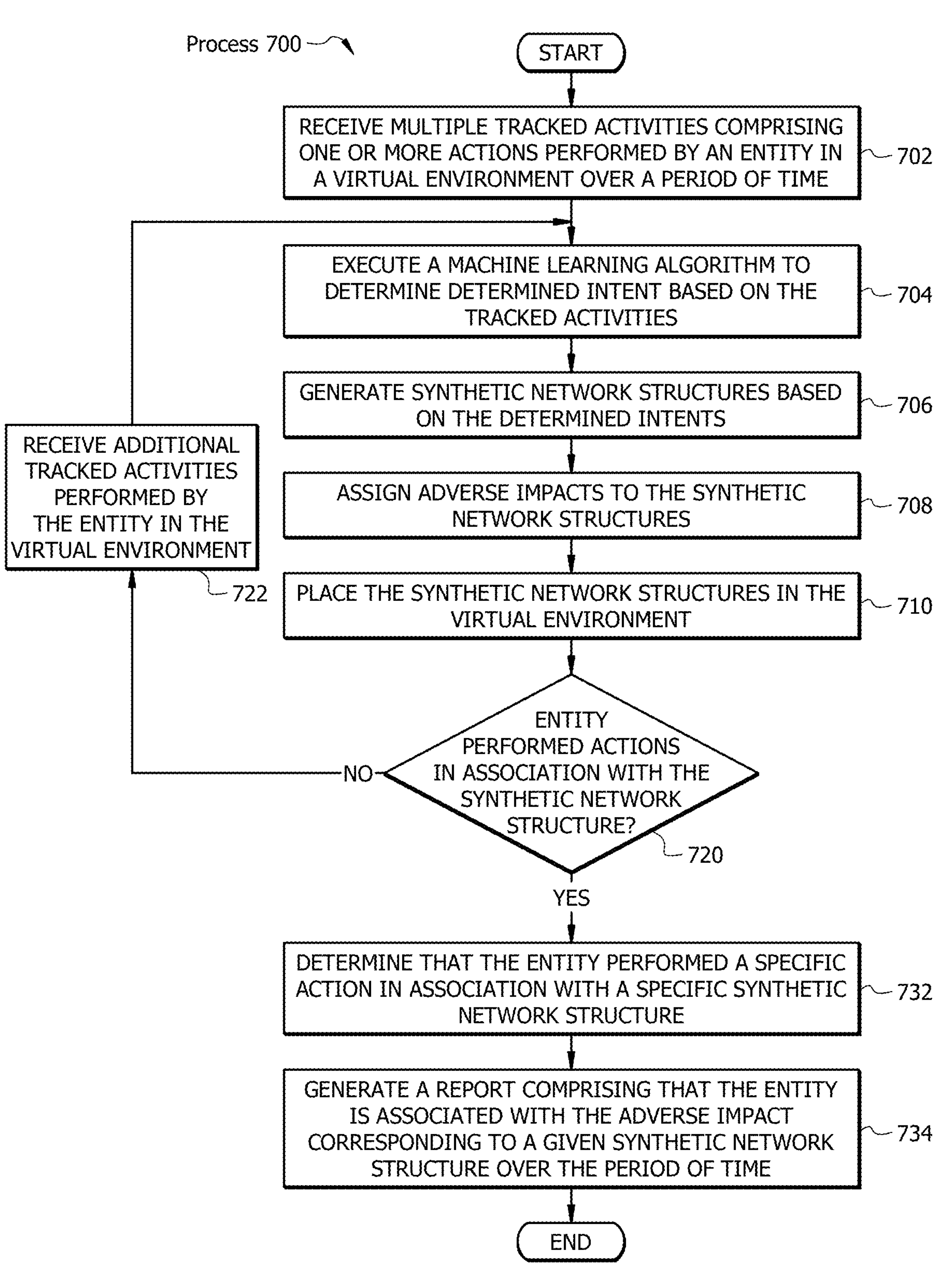
FIG. 7 illustrates an example flowchart of a method to perform the security operations of FIG. 6 in accordance with one or more embodiments.

As described above, this disclosure provides various systems and methods to dynamically generate access triggers to a network. Further, the disclosure provides various systems and methods to dynamically generate synthetic structures. Then, the disclosure provides various systems and methods to evaluate entity operations across multiple virtual environments. FIG. 1 illustrates a system 100 in which a server 102 configured to analyze communication feedback 104 received from a communication network. FIG. 2 illustrates multiple security operations 200 performed by the system 100 of FIG. 1. FIG. 3 illustrates a process 300 performed by the system 100 of FIG. 1. FIG. 4 illustrates multiple security operations 400 performed by the system 100 of FIG. 1. FIG. 5 illustrates a process 500 performed by the system 100 of FIG. 1. FIG. 6 illustrates multiple security operations 600 performed by the system 100 of FIG. 1. FIG. 7 illustrates a process 700 performed by the system 100 of FIG. 1.

System Overview

FIG. 1 illustrates an example system 100, in accordance with one or more embodiments. The system 100 may comprise a server 102 configured to configured to analyze communication feedback 104 received from a communication network. The system 100 includes a server 102 communicatively coupled to a user device 106, a user device 106*b*, a user device 106*c*, and a user device 106*d* (collectively, user devices 106) via a network 110. The user devices 106 may be user nodes configured to trigger exchanges of data and/or perform one or more communication operations 150 with the server 102 via the network 110. The user devices 106 may be working nodes configured to receive instructions to perform one or more communication operations 150 based on instructions received from the server 102. In some embodiments, some of the user devices 106 may be clustered together in one or more user device groups 112. Each of the user devices 106 may be associated with one or more corresponding operators. These operators are shown as a user 116*a*, a user 116*b*, and a user 116*c* (collectively, users 116) in the user device groups 112. In FIG. 1, the user device group 112 is shown comprising the user 116*a* associated with the user device 106*b*, the user 116*b* associated with the user device 106*c*, and the user 116*c* associated with the user device 106*d*.

In one or more embodiments, the example of FIG. 1 shows an electronic attacker 118*a*, an electronic attacker 118*b*, an electronic attacker 118*c*, and an electronic attacker 118*d* (collectively, electronic attackers 118). In some embodiments, some of the electronic attackers 118 may be clustered together in one or more attacker groups 120. In FIG. 1, the attacker group 120 is shown comprising the electronic attacker 118*b*, the electronic attacker 118*c*, and the electronic attacker 118*d*. These electronic attackers 118 may be bad actors attempting to perform one or more attacks 122 (e.g., attacks 122*a* and attacks 122*b*) to the server 102, the user devices 106, the network, and/or the user device groups 112.

In one or more embodiments, the server 102 may comprise one or more server databases 124, one or more server input (I)/output (O) interfaces 126, at least one server processor 128, and at least one server memory 130 communicatively coupled to one another. In some embodiments, the server memory 130 may comprise instructions 132, communication feedback 104 comprising one or more actions 134, information associated with one or more entities 136, and one or more tracked activities 138, one or more assigned adverse impacts 140, one or more thresholds 142, one or more determined intents 144, one or more dynamic triggers 146, one or more access commands 148, one or more communication operations 150, one or more attack depictions 152, one or more synthetic network structures 154, one or more requests 156, one or more virtual environments 158, one or more denylists 160, one or more electronic attackers 162, one or more synthetic elements 164, one or more artificial intelligence (AI) commands 166, user information 170 comprising one or more user profiles 172 associated with one or more entitlements 174 to access one or more services (e.g., applications) in a communication network (e.g., the network 110), one or more machine learning (ML) algorithms 175 configured to train one or more models 176, one or more rules and policies 177, and one or more network resources 178.

Referring to the user device 106*a* a non-limiting example, the user device 106*a* may comprise one or more device interfaces 182, one or more device peripherals 184, at least one device processor 186, and at least one device memory 188 communicatively coupled to one another. The device memory 188 may comprise device instructions 190 and/or one or more local applications 192.

System Components

Server

The server 102 is generally any device or apparatus that is configured to process data and communicate with computing devices (e.g., the user devices 106), additional databases, systems, and the like, via the one or more server I/O interfaces 126 (i.e., a user interface or a network interface). The server 102 may comprise the server processor 128 that is generally configured to oversee operations of the processing engine. The operations of the processing engine are described further below in conjunction with the system 100 described in FIG. 1, the security operations 200 in FIG. 2, the process 300 described in FIG. 3, the security operations 400 in FIG. 4, the process 500 described in FIG. 5, the security operations 600 in FIG. 6, and the process 700 described in FIG. 7.

The server 102 comprises multiple server databases 124 configured to provide one or more memory resources to the server 102 and/or the user devices 106. The server 102 comprises the server processor 128 communicatively coupled with the converter 123, the server databases 124, the server I/O interfaces 126, and the server memory 130. The server 102 may be configured as shown, or in any other configuration. In one or more embodiments, the server databases 124 are configured to store data that enables the server 102 to configure, manage and coordinate one or more middleware systems. In some embodiments, the server databases 124 store data used by the server 102 to function as a halfway point in between one or more services and other tools or databases.

In one or more embodiments, the server I/O interfaces 126 may be configured to enable wired and/or wireless communications. The server I/O interfaces 126 may be configured to communicate data between the server 102 and other user devices (i.e., the user devices 106), network devices (i.e., routers in the network 110), systems, or domain(s) via the network 110. For example, the server I/O interfaces 126 may comprise a WI-FI interface, a LAN interface, a WAN interface, a modem, a switch, or a router. The server processor 128 may be configured to send and receive data using the server I/O interfaces 126. The server I/O interfaces 126 may be configured to use any suitable type of communication protocol. In some embodiments, the server I/O interfaces 126 may be an admin console comprising a web browser-based or graphical user interface used to manage a middleware server domain via the server 102. A middleware server domain may be a logically related group of middleware server resources that managed as a unit. A middleware server domain may comprise the server 102 and one or more managed servers. The managed servers may be standalone devices and/or collected devices in the server cluster. The server cluster may be a group of managed servers that work together to provide scalability and higher availability for the services. In this regard, the services are developed and deployed as part of at least one domain. In other embodiments, one instance of the managed servers in the middleware server domain may be configured as the server 102. The server 102 provides a central point for managing and configure the managed servers and any of the one or more services.

The server processor 128 comprises one or more processors communicatively coupled to the server memory 130. The server processor 128 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 128 may be a programmable logic device, a microcontroller, a microprocessor, or any suitable combination of the preceding. The one or more server processor 128 are configured to process data and may be implemented in hardware or software executed by hardware. For example, the server processor 128 may be 8-bit, 16-bit, 32-bit, 64-bit or of any other suitable architecture. The server processor 128 may include an arithmetic logic unit (ALU) for performing arithmetic and logic operations, processor registers that supply operands to the ALU and store the results of ALU operations, and a control unit that fetches the instructions 132 from the server memory 130 and executes them by directing the coordinated operations of the ALU, registers and other components. In this regard, the one or more server processor 128 are configured to execute various instructions. For example, the one or more server processor 128 are configured to execute the instructions 132 to implement the functions disclosed herein, such as some or all of those described with respect to FIGS. 1-7. In some embodiments, the functions described herein are implemented using logic units, FPGAs, ASICs, DSPs, or any other suitable hardware or electronic circuitry.

In one or more embodiments, the server I/O interfaces 126 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 126 may be configured to support any suitable type of communication protocol as would be appreciated by one of ordinary skill in the art. In one or more embodiments, the server I/O interfaces 126 may comprise one or more sensors configured to evaluate physical phenomena surrounding the server 102 and/or one or more of the user devices 106. The sensors may be proximity sensors, optical sensors, and the like.

The server memory 130 may be volatile or non-volatile and may comprise a read-only memory (ROM), random-access memory (RAM), ternary content-addressable memory (TCAM), dynamic random-access memory (DRAM), and static random-access memory (SRAM). The server memory 130 may be implemented using one or more disks, tape drives, solid-state drives, and/or the like. The server memory 130 is operable to store the instructions 132, the communication feedback 104 comprising the one or more actions 134, the information associated with the one or more entities 136, and the one or more tracked activities 138, the one or more assigned adverse impacts 140, the one or more thresholds 142, the one or more determined intents 144, the one or more dynamic triggers 146, the one or more access commands 148, the one or more communication operations 150, the one or more attack depictions 152, the one or more synthetic network structures 154, the one or more requests 156, the one or more virtual environments 158, the one or more denylists 160, the one or more electronic attackers 162, the one or more synthetic elements 164, the one or more AI commands 166, the user information 170 comprising the one or more user profiles 172 associated with the one or more entitlements 174 to access the one or more services (e.g., applications) in the communication network (e.g., the network 110), the one or more ML algorithms 175 configured to train the one or more models 176, the one or more rules and policies 177, and the one or more network resources 178. The instructions 132 may comprise any suitable set of instructions, logic, rules, or code operable to execute the server processor 128.

The one or more communication operations 150 may be one or more data exchanges performed between two or more network devices in the system 100. The network devices may comprise the server 102 and one or more of the user devices 106 among others. In one or more embodiments, the communication operations 150 may be audio communications exchanged as part of audio conversations (e.g., during a telephonic call) between two or more network devices. The communication operations 150 may be image and/or text communications exchanged as part of image-based conversations (e.g., during videocalls and/or chat exchanges) between two or more network devices.

The communication feedback 104 may comprise information to one or more actions 134, information associated with one or more entities 136, and one or more tracked activities 138 associated with the entities 136. The communication feedback 104 may comprise information provided by and/or obtained from the entities 136 during one or more communication operations 150 in the network 110. The server 102 may be configured to perform one or more retrieving operations configured to determine the tracked activities 138 (e.g., metadata) from the communication operations 150 and generate one or more reports associated with interactions of the entities 136 in the network 110. The communication feedback 104 may be provided continuously and/or periodically over time. The communication feedback 104 may be data indicating whether any of the entities 136 are attempting to perform one or more specific data exchange operations in the network 110. The communication feedback 104 may be obtained via one or more ML models configured with a natural language processing (NPL) that identifies possible adverse impacts based on input audio, input text, and/or the actions 134 related to fraudulent activities or crime within the network 110. The communication feedback 104 may comprise multiple sound, text, and/or action data samples. Each data sample may comprise a magnitude and a duration. The communication feedback 104 may be configured to indicate one or more attempted actions associated with the communication operations 150.

In one or more embodiments, the communication feedback 104 may indicate one or more changes in the behavior associated with one or more of the entities 136. In one or more embodiments, the actions 134 and the tracked activities 138 are information data representative on one or more communication operations 150 performed and/or triggered by the one or more entities 136 in the network 110. The communication feedback 104 may be data that represents extracted information and/or summarized information associated with one or more operations attempted and/or performed by the entities 136. In the example of FIG. 1, the communication feedback 104 may comprise metadata comprising business metadata and/or passive metadata comprising technical metadata. The communication feedback 104 may be business metadata used by one of the applications and may be dynamic in nature. The passive metadata may be metadata collected from the applications during one or more application operations and may be static in nature. In one or more embodiments, the reports comprise one or more communications and/or transmissions configured to provide information relating to a status of one or more of the communication operations 150. The reports may comprise and/or trigger alerts to other servers and/or one or more of the user devices 106.

The one or more adverse impacts 140 may be one or more values configured to provide indicators of possible adverse changes to the network 110 caused by one or more one or more actions 134. The adverse impacts 140 may be determined as results of evaluating the communication feedback 104 and/or one or more of the communication operations 150. The adverse impacts 140 may be generated along the dynamic triggers 146, the synthetic network structures 154, and/or the synthetic elements 164. The adverse impacts 140 may comprise one or more warning commands indicating a potential exposure of the actions 134 and/or tracked activities 138 associated with the one or more entities 136. In some embodiments, the adverse impacts 140 are recommendations presented to the server 102 based on one or more analyses of the communication feedback 104. The adverse impacts 140 may comprise one or more dynamic configuration commands configured to inform determination of the one or more determined intents 144. The adverse impacts 140 may be associated with one or more values representative of possible adverse impacts in the network 110.

The thresholds 142 may be one or more specific numbers and/or number ranges associated with a specific parameter and/or indicator. The thresholds 142 may be a specific value representing a higher boundary or a lower boundary. The thresholds 142 may be one or more threshold ranges comprising higher boundaries and lower boundaries. The thresholds 142 may be a percentage value representing a similarity and/or a difference between one or more values assigned to the adverse impacts 140 and/or one or more values assigned to the one or more communication operations 150. The thresholds 142 may be determined based on information associated with the communication operations 150. The thresholds 142 may be determined dynamically over time. The thresholds 142 may be predefined and/or predetermined in accordance with information in activity associated with one or more of the communication operations 150. In some embodiments, the server 102 may be configured to calculate the thresholds 142 based on information obtained via the server I/O interfaces 126 and/or device interfaces 182.

The determined intents 144 may be representative of one or more intents to perform a specific communication operation 150. The determined intents 144 may be one or more action items to be performed to at least partially fulfill one or more target operations associated with the communication feedback 104. In some embodiments, the determined intents 144 may be one or more operations to be performed to meet one or more target commands at least partially. The determined intents 144 may be mapped to one or more existing communication operations 150. Each determined intent 144 may be a basis to generate one or more dynamic triggers 146 to perform one or more modifications to one or more access commands 148. The determined intents 144 may comprising one or more action items to complete, perform, and/or trigger one or more target operations in the communication network. The action items may be one or more operations, commands, and/or triggers to be performed in association with one or more of the user devices 106. The determined intents 144 may be predicted future behaviors that one or more of the entities 136 are expected to perform in the communication network. In some embodiments, the determined intents 144 may be one or more assumed actions associated with the communication operations 150.

The dynamic triggers 146 may be one or more triggers configured to alert the server 102 of specific interactions (e.g., actions 134) in the communication network. The dynamic triggers 146 may be dynamically generated and placed in the communication network. The dynamic triggers 146 may be one or more indicators configured to provide one or more messages, notifications, and/or alerts. The dynamic triggers 146 may be one or more parameters configured to provide the communication feedback 104.

The one or more access commands 148 may be one or more indicators configured to provide information associated with one or more operations of the entities 136 accessing the network 110. The access commands 148 may be stored in one or more data formats. The server 102 may be configured to generate the one or more access commands 148 based on communication feedback 104. In this regard, the access commands 148 may be information indicating modifications and/or assignments of resources in the network 110. The access commands 148 may be replaced, updated, and/or modified dynamically. The access commands 148 may be replaced, updated, and/or modified periodically. The access commands 148 may comprise results of one or more operations of the processing engine configured to perform as operations that retrieve and analyze the communication feedback 104. The access commands 148 may be one or more communication links configured to enable access between a user device 106 determined to perform one or more legitimate communication operations 150.

The one or more communication operations 150 may be one or more operations executed by the server processor 128 configured to enable data objects to be exchanged between the user devices 106 and/or the server 102. In one or more embodiments, the communication operations 150 may be configured to indicate one or more data objects to be exchanged between the server 102 and at least one of the user devices 106. The server 102 may be configured to generate and analyze one or more communication operations 150 to confirm whether one or more entities 136 associated with communication operations 150 are legitimately associated with at least one of the user devices 106. The server 102 may be configured to perform one or more operations in which the server 102 is configured to confirm whether one or more communication operations 150 belong to a specific user device 106.

The one or more attack depictions 152 may be maps and/or representations of one or more areas or environments including one or more rendered objects representing network resources 178 via one or more of the user devices 106 and/or one or more of the server I/O interfaces 126. The one or more attack depictions 152 may be one or more communication maps depicting one or more entities 136 and/or one or more movements associated with the entities 136 in the communication network. The one or more attack depictions 152 may comprise visual representation of the one or more actions 134, the one or more tracked activities 138, and/or one or more additional elements (e.g., the one or more network resources 178, the one or more synthetic network structures 154, and/or the one or more synthetic elements 164 among others) in the communication feedback 104. The one or more attack depictions 152 may comprise heat maps visualizing the actions 134 and/or the tracked activities 138 in association with the one or more entities 136 in the communication network. The one or more attack depictions 152 may represent a moment in time for one or more of the entities 136 in the communication network. The one or more attack depictions 152 may represent multiple instances over time for one or more of the entities 136 in the communication network.

The one or more synthetic network structures 154 may be one or more network structures configured to resemble one or more network resources 178. In this regard, the synthetic network structures 154 may be data structures, virtual accesses to physical and/or digital network devices, and/or one or more databases among other network resources 178. The synthetic network structures 154 may be configured to provide a digital appearance (e.g., a digital representation) of the one or more network resources 178 in the one or more virtual environments 158.

The one or more requests 156 may be one or more communications configured to provide triggers in the form of communication or control signals to start operations such as fetching the instructions 132 or running one or more authentication operations. The requests 156 may provide user information 170 to the server 102 to indicate at least one user profile 172 associated with one or more of the entitlements 174 to access and/or modify any of the applications available in the server 102. In some embodiments, the requests 156 may be configured to provide lists, security information, and configuration commands that the server 102 uses to set up a specific service for one of the user devices 106. The requests 156 may comprise data that provides starting procedure configuration to the server 102. In one or more embodiments, the requests 156 may be optimized instructions that trigger establishing of a specific procedure in the server 102.

The authentication operations may be one or more operations executed in conjunction with the one or more operations ML algorithms 175. The one or more authentication operations may be configured to enable data objects to be exchanged between the user devices 106 and/or the server 102. In one or more embodiments, the authentication operations may be configured to indicate one or more data objects (e.g., via the communication operations 150) to be exchanged between the server 102 and at least one of the user devices 106. The authentication operations may be configured to generate and analyze one or more communication operations 150 to confirm whether one or more entities associated with communication operations 150 are legitimately associated with at least one of the user devices 106. The authentication operations may be one or more operations in which the server 102 is configured to confirm whether one or more communication operations 150 associated with a specific entity 136 belong to a specific user device 106.

The one or more virtual environments 158 may be one or more sandbox environments in which the one or more entities 136 are configured to operate in isolation from the rest of the communication network. In some embodiments, the virtual environments 158 may comprise one or more of the synthetic elements 164 and/or one or more tools to manipulate and/or modify simulated information representative of one or more network resources 178. The one or more virtual environments 158 may be one or more copies of one or more portions of the communication network. In one or more embodiments, the server 102 may comprise less of more virtual environments 158 than those shown in FIGS. 2, 4, and 6. While engaging in the virtual environments 158 via the representation of the network resources 178, the entities 136 may interact with digitalized (e.g., simulated) versions of other user devices 106, objects, and/or entities through a respective digital entity.

In one or more embodiments, the synthetic elements 164 may be one or more data items, information pieces, and/or parameters configured to resemble components of one or more network resources 178. For example, a specific synthetic element 164 created for a synthetic network structure 154 configured to resemble a database comprising user lists may be configured to resemble a data entry comprising a name and/or additional sensitive information. The synthetic elements may be generated to appear similar to the network resources 178 without including any specific relation to any portions of the network resources 178. In this regard, the synthetic elements 164 may be configured to represent a similar type of data to those found in certain network resources 178.

In some embodiments, the denylists 160 may comprise alerts generated to one or more entities 136 in the communication network. In this regard, the denylists 160 may associate callers to the one or more user profiles 172 with fraudulent remarks if an entity 136 is identified to be a bad actor (e.g., one or the electronic attackers 118). The alerts may be warnings generated for the entities 136 in the form of feedback (e.g., notifications, tactile feedback, and/or visual feedback among others). The denylists 160 may be lists comprising online information related to one or more identified electronic attackers 118, spam callers, and otherwise blocked callers. The server 102 may reference the denylists 160 to inform one or more of the user devices 106 that a communication request 156 should not be received.

The user information 170 may comprise the one or more user profiles 172, one or more entitlements 174, and one or more services. In one or more embodiments, the user profiles 172 may comprise multiple profiles associated with one or more entitlements 174 to access and/or modify the services. Each of the user profiles 172 may be associated with one or more entitlements 174. The entitlements 174 may indicate that a given user device 106 is allowed to access one or more network resources in accordance with the one or more rules and policies 177. The entitlements 174 may indicate that a given user device 106 is allowed to perform one or more operations in the system 100 (e.g., provide a specific application data access to one of the users 116). To secure or protect operations of the user devices 106 from bad actors, the entitlements 174 may be assigned to a given user profile 172 in accordance with updated security information, which may provide guidance parameters to the use of the entitlements 174 based at least upon corresponding rules and policies 177. In one or more embodiments, the one or more services perform one or more application operations using the access commands 148. In some embodiments, the user profiles 172 may comprise multiple profiles for the users 116. Each user profile 172 may comprise one or more entitlements 174. As described above, the entitlements 174 may indicate that a given user 116 is allowed to access one or more network resources in accordance with one or more rules and policies 177. The entitlements 174 may indicate that a given user 116 is allowed to perform one or more data exchanges with the server 102 via the network 110. In one or more embodiments, each of the user profiles 172 may comprise information about at least one user 116 entitled to trigger one or more communication operations 150.

In one or more embodiments, the ML algorithms 175 may be executed by the server processor 128 to evaluate the communication operations 150 and/or the communication feedback 104. Further, the ML algorithms 175 may be configured to interpret and transform the requests 156, the one or more communication operations 150, the communication feedback 104, and/or the instructions 132 into structured data sets and subsequently stored as files or tables. The ML algorithms 175 may cleanse, normalize raw data, and derive intermediate data to generate uniform data in terms of encoding, format, and data types. The ML algorithms 175 may be executed to run user queries and advanced analytical tools on the structured data and/or the unstructured data in accordance with one or more ML models 176. The ML algorithms 175 may be configured to generate the one or more AI commands 166 based on one or more results of the testing operations. The AI commands 166 may be parameters that proactively trigger one or more of the authentication operations. The AI commands 166 may be combined with the existing instructions 132 to dynamically trigger and/or perform the data authentication operations and/or some or all of the communication operations 150. The AI commands 166 may be configured to trigger one or more cognitive AI operations in accordance with one or more ML models 176. The ML models 176 may be trained by the one or more ML algorithms 175 based on historic information associated with any authentication operations performed with the server 102.

The rules and policies 177 may be security configuration commands or regulatory operations predefined by an organization or one or more users 116. In one or more embodiments, the rules and policies 177 may be dynamically defined by the one or more users 116. The rules and policies 177 may be prioritization rules configured to instruct one or more user devices 106 to perform one or more evaluating operations or perform one or more operations in the system 100 in a specific communication operations 150. The one or more rules and policies 177 may be predetermined or dynamically assigned by a corresponding user 116 or an organization associated with the users 116.

In one or more embodiments, the server databases 124 may be one or more repositories configured to store information. In one example, the server 102 may determine the server processor 128 is available (e.g., running) to perform a specific service. In another example, the server 102 may determine that a specific managed server is running to enable a testing application and/or perform the specific service upon receiving a server response indicating that a corresponding managed server is available to perform the service. The server databases 124 may be configured to store one or more representations of data instead of storing coded data. In this regard, the representations may be encoded in accordance with an encoder configured to identify and/or verify exchanged information. For example, the server databases 124 may comprise one or more representations of the communication feedback 104 and/or the access commands 148. As the communication feedback 104 is obtained, the server processor 128 may be configured to process the communication feedback 104 in accordance with the one or more authentication operations.

In one or more embodiments, the server 102 may be configured to generate and inject synthetic network structures 154 comprising one or more synthetic elements 164 to cause entities 136 associated with one or more electronic attackers 118 to enter one or more virtual environments 158. The virtual environments 158 may be forensic sandboxes where interactions of one or more virtual entities (e.g., a digital access and/or representation of the entities 136) may be tracked over time. If a virtual version of an entity 136 is determined to be associated with an electronic attacker 118, the virtual version of the entity 136 is determined to be a virtual representation of the electronic attacker 118. The virtual environments 158 may be partitions of the communication network that are isolated from the rest of the network 110. In some embodiments, the virtual environments 158 may be populated with one or more synthetic network structures 154 comprising one or more synthetic elements 164 that resemble one or more network resources 178. The interactions of the electronic attackers 118 with the one or more synthetic network structures 154 and specific synthetic elements 164 may archived, processed, and tracked over time. In one or more embodiments, additional specific synthetic network structures 154 and/or specific synthetic elements 164 may be generated based on the communication feedback 104 received from the communication network. The information obtained from the communication feedback 104 may be used to train one or more ML models 176.

User Device

In one or more embodiments, each of the user devices 106 (e.g., the user device 106*a*, the user devices 106*b*-106*d* in the user device group 112) may be any computing device configured to communicate with other devices, such as the server 102, other user devices 106 in the user device group 112, databases, and the like in the system 100. Each of the user devices 106 may be configured to perform specific functions described herein and interact with the server 102 and/or any other user devices 106. Examples of the user devices 106 comprise, but are not limited to, a laptop, a computer, a smartphone, a tablet, a smart device, an IoT device, a simulated reality device, an augmented reality device, or any other suitable type of device. The requests 156 may be provided by the user devices 106 via one or more interfaces comprising input displays, voice microphones, or sensors capturing gestures performed by a corresponding user 116.

The user devices 106 may be hardware configured to create, transmit, and/or receive information. The user devices 106 may be configured as a provider node or as worker nodes. The user devices 106 may be configured to receive inputs from a user, process the inputs, and generate data information or command information in response. The data information may include documents or files generated using a graphical user interface (GUI).

Referring to the user device 106*a* as a non-limiting example, the command information may include input selections/commands triggered by a user using a peripheral component or one or more device peripherals 184 (i.e., a keyboard) or an integrated input system (i.e., a touchscreen displaying the GUI). The user devices 106 may be communicatively coupled to the server 102 via a network connection (i.e., the device peripherals 184). The user devices 106 may transmit and receive data information, command information, or a combination of both to and from the server 102 via the device interfaces 182. In one or more embodiments, the user devices 106 are configured to exchange data, commands, and signaling with the server 102. In some embodiments, the user devices 106 are configured to receive at least one security system configuration from the server 102 to implement a security system (one of the one or more local applications 192) at one of the user devices 106.

In one or more embodiments, the device interfaces 182 may be any suitable hardware or software (e.g., executed by hardware) to facilitate any suitable type of communication in wireless or wired connections. These connections may comprise, but not be limited to, all or a portion of network connections coupled to additional user devices 106, the server 102, the Internet, an Intranet, a private network, a public network, a peer-to-peer network, the public switched telephone network, a cellular network, a LAN, a MAN, a WAN, and a satellite network. The device interfaces 182 may be configured to support any suitable type of communication protocol.

In one or more embodiments, the one or more device peripherals 184 may comprise audio devices (e.g., speaker, microphones, and the like), input devices (e.g., keyboard, mouse, and the like), or any suitable electronic component that may provide a modifying or triggering input to the user devices 106. For example, the one or more device peripherals 184 may be speakers configured to release audio signals (e.g., voice signals or commands) during media playback operations. In another example, the one or more device peripherals 184 may be microphones configured to capture audio signals. In one or more embodiments, the one or more device peripherals 184 may be configured to operate continuously, at predetermined time periods or intervals, or on-demand.

The device processor 186 may comprise one or more processors communicatively coupled to and in signal communication with the device interfaces 182, the device peripherals 184, and the device memory 188. The device processor 186 is any electronic circuitry, including, but not limited to, state machines, one or more CPU chips, logic units, cores (e.g., a multi-core processor), FPGAs, ASICs, or DSPs. The device processor 186 may be a programmable logic device, a microcontroller, a microprocessor, or any suitable combination of the preceding. The one or more processors in the device processor 186 are configured to process data and may be implemented in hardware or software executed by hardware. For example, the device processor 186 may be an 8-bit, a 16-bit, a 32-bit, a 64-bit, or any other suitable architecture. The device processor 186 may comprise an ALU to perform arithmetic and logic operations, processor registers that supply operands to the ALU, and store the results of ALU operations, and a control unit that fetches software instructions such as device instructions 190 from the device memory 188 and executes the device instructions 190 by directing the coordinated operations of the ALU, registers, and other components via a device processing engine (not shown). The device processor 186 may be configured to execute various instructions.

The device memory 188 may comprise multiple operation data and one or more local applications 192 associated with the server 102. The operation data may be data configured to enable one or more data processing operations such as those described in relation with the server 102. The operation data may be partially or completely different from those comprised in the server memory 130. The local applications 192 may be one or more of the services described in relation with the server 102. In some embodiments, the local applications 192 may be partially or completely different from those comprised in the server memory 130.

Network

The network 110 facilitates communication between and amongst the various devices of the system 100. The network 110 may be any suitable network operable to facilitate communication between the server 102 and the user devices 106 of the system 100. The network 110 may include any interconnecting system capable of transmitting audio, video, signals, data, data packets, messages, or any combination of the preceding. The network 110 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

Electronic Attacker

In one or more embodiments, electronic attackers 118 may be any electronic device that influences the operations of one or more devices in the network 110. In some embodiments, the electronic attacker group 120 comprises multiple devices configured to interfere with operations of devices in the network 110. The attacker group 120 comprises the electronic attacker 118*b*, the electronic attacker 118*c*, and the electronic attacker 118*d*. Each of the electronic attackers may perform one or more attacks 122 (e.g., attacks 122*a* and attacks 122*b*). The attacks 122 (e.g., one or more electronic attacks) may be one or more unexpected operations triggered by the electronic attackers 118 in the network 110. In some embodiments, a single electronic attacker 118 may perform one or more attacks 122*a*. In other embodiments, multiple electronic attackers 118 (e.g., the attacker 118*b*, the attacker 118*b*, and the attacker 118*d* in the attacker group 120) may perform one or more attacks 122*b*.

Referring as a non-limiting example to the electronic attacker 118*a* of FIG. 1, the electronic attacker 118*a* may be hardware and/or software, executed by hardware, that launches the attacks 122*a* to affect the operations performed by the server 102 and/or the user devices 106. Although not explicitly shown in FIG. 1, the electronic attacker 118*a* may include a processor, a memory, and a transceiver configured to generate one or more communication signals. In one or more embodiments, the electronic attacker 118*a* is a new device in a predetermined area in which the server 102 and/or the user devices 106 are located. In some embodiments, radio waves, electromagnetic (EM) signaling, and/or communication operations 150 from the electronic attacker 118*a* are monitored over time in the network 110 to be evaluated in combination with one or more authentication operations.

In one or more embodiments, the electronic attacker 118*a* may be a person, people, or an automated electric component that use the attacks 122*a* to hack communications and operations of a specific user device 106 and/or the server 102. As a result of the attacks 122*a*, the electronic attacker 118*a* may control communications or operations of one or more of the hacked user device 106. In this regard, the electronic attacker 118*a* may modify, cancel, or generate communications or operations in the hacked user devices 106. The electronic attacker 118*a* may pretend to perform one or more operations on behalf of one or more of the user devices 106.

Security Operations to Dynamically Generate Access Triggers to a Network

FIG. 2 shows multiple security operations 200 in which the system 100 of FIG. 1 is configured to dynamically generate access triggers (e.g., dynamic triggers 146) to a communication network 210, in accordance with one or more embodiments. In FIG. 2, the security operations 200 comprise multiple transitions 212-220 in the communication network 210. The security operations 200 may be performed between the server 102 and one or more entities 136 to determine whether the entities are one of more of the user devices 106 or one or more of the electronic attackers 118. The security operations 200 comprise the server 102 and at least one electronic attacker 118 communicatively coupled to one another in the communication network 210 via a connection 222 and a connection 224, respectively. In some embodiments, the electronic attacker 118*a* may be associated with a virtual entity 136*a*. The virtual entity 136*a* may enter the communication network 210 in a specific virtual direction 230. As time progresses, the virtual entity 136*a* may perform transitions 212-220 to interact with one or more network resources 178. These network resources 178 may be a group of databases 242, a group of databases 244, a virtual device 246, and a virtual environment 158*a*. The virtual environment 158*a* may comprise a simulation 250 representing an electric component 252 and a simulation 254 representing an electric component 256.

In the communication network 210 of FIG. 2, the server 102 may be configured to receive communication feedback 104 comprising that the virtual entity 136*a* transitions to the databases 242 at a first time instance after a transition 212. Herein, the virtual entity 136*a* is presented with one or more divergent paths 260 at a second time instance. A first divergent path may comprise a transition 214 to interact with the database 244 and a second divergent path may comprise a transition 216 to interact with the electric component 256 in the virtual environment 158*a*. The communication feedback 104 received in association with the virtual entity 136*a* may be determined at determination 262 to have performed an attack 122*a* against a database 244. At this point, in response to receiving a dynamic trigger 146*a*, the virtual entity 136*a* is determined to be a virtual attacker 270 associated with the electronic attacker 118*a*. After a transition 218, the virtual attacker 270 may be determined to inspect the virtual environment 158*a* at a third time. The communication feedback 104 received in association with the virtual attacker 270 may be determined to transition via a transition 220 to another area of the communication network 210. At this point, in response to receiving a dynamic trigger 146*b*, the virtual attacker 270 is determined to have performed an attack 122*b* to the virtual device 246. Further, in response to receiving a dynamic trigger 146*c*, the virtual attacker 270 is determined to have performed an attack 122*c* to the electric component 252 and the electric component 256 in the virtual environment 158*a*.

In FIG. 2, the communication network 210 may be a portion of the network 110 comprising the databases 242, the database 244, the virtual device 246, and the virtual environment 158*a*. In some embodiments, one or more portions of the communication network 210 may be one or more attack depictions 152 representative of communication feedback 104 received by the server 102 from the network 110. In the example of FIG. 2, the virtual entity 136*a* is shown entering into one or more portions of the communication network 210 in the virtual direction 230. At transition 212, the virtual entity 136*a* is tracked approaching the one or more databases 242 at a first position. At this stage, the server 102 may determine that it is undefined whether the virtual entity 136*a* is associated with the electronic attacker 118*a*. The virtual entity 136*a* may be presented with one or more divergent paths 260. A first divergent path may be presented to the virtual entity 136*a* to transition to real network resources 178. A second divergent path may be presented to the virtual entity 136*a* to transition to one or more synthetic network structures 154 assigning one or more dynamic triggers 146 to determine that the virtual entity 136*a* is associated with one or more user devices 106 or one or more electronic attackers 118. At transition 214, the virtual entity 136*a* moves to interact with the database 244 at a second position. Herein, the virtual entity 136*a* attacks the database 244 via attack 122*a* (e.g., performing one or more unexpected interactions) causing the dynamic trigger 146*a* to be released at the server 102. The determination 262 may be representative of one or more authorization operations where the virtual entity 136*a* is determined to be associated with the electronic attacker 118*a*. After this point, the virtual entity 136*a* may be tracked as the virtual attacker 270 and any network resources 178 may be protected with additional safeguards to defend from direct interactions with the virtual attacker 270. At transition 218, the virtual attacker 270 is shown moving close to inspect the virtual environment 158*a* at a third position. At transition 220, the virtual entity 136*a* moves to interact with the virtual device 246 and the simulated environment 158*a* at a fourth position. Herein, the virtual entity 136*a* attacks the virtual device 246 via attack 122*b* (e.g., performing one or more unexpected interactions) causing the dynamic trigger 146*b* to be released at the server 102 and the virtual environment 158*a* via attack 122*c* (e.g., performing one or more unexpected interactions) causing the dynamic trigger 146*c* to be released at the server 102.

Example Process to Dynamically Generate Access Triggers to a Network

FIG. 3 illustrates an example flowchart of a process 300 configured to dynamically generate access triggers (e.g., dynamic triggers 146) to a network (e.g., the communication network 210), in accordance with one or more embodiments. Modifications, additions, or omissions may be made to the process 300. The process 300 may comprise more, fewer, or other operations than those shown in FIG. 3. For example, operations may be performed in parallel or in any suitable order. While at times discussed as the server 102, the user devices 106, or components of any of thereof performing operations described in operations 302-334 in the process 300, any suitable system or components of the system 100 may perform one or more operations of the process 300. For example, one or more operations of the process 300 may be implemented, at least in part, in the form of instructions 132 of FIG. 1, stored on non-transitory, tangible, machine-readable media (e.g., a non-transitory computer-readable medium such as server memory 130 of FIG. 1) that when run by one or more processors (e.g., the processor 128 of FIG. 1) may cause the one or more processors to perform operations described in operations 302-334.

The server 102 may be configured to evaluate communication feedback 104 associated with one or more entities 136 (e.g., the entity 136*a*) and dynamically generating access triggers (e.g., dynamic triggers 146) to a communication network 210. Herein, the server 102 is configured to generating dynamic triggers 146 to route communications in a secure network (e.g., the communication network 210). In particular, the server 102 is configured to generate and present activation triggers to determine whether accessing entities 136 are bad actors (e.g., associated with the one or more electronic attackers 118). As potential bad actors are determined to approach the secure network, the server 102 may be configured to execute the ML algorithms 175 to determine possible next steps that the possible bad actors may follow. At this stage, the server 102 is configured to dynamically generate one or more triggers that may act as “trip wires” to cause the bad actors to be routed away from the secure network (e.g., into one or more virtual environments 158). These dynamic triggers 146 may take the shape of access to synthetic databases and/or biometric authentication processes presented to the potential bad actors. The server 102 may be configured to create the divergent paths 260 that move the potential bad actors away from the secure network each time a bad actor falls for a presented trigger. Further, the server 102 may be configured to determine whether a potential bad actor is a legitimate user (e.g., the given entity 136 is associated with one or more user devices 106 authenticated to comprise user information 170) of the secure network based on whether an entity 136*a* activates fewer dynamic triggers 146 within a period of time. Herein, cognitive AI models (e.g., specifically-trained ML models 176) may be implemented to determine a confidence level associated with each dynamic trigger 146. The servers 102 may determine that an entity 136*a* attempting to access the secure network is a bad actor if the entity 136*a* activates a predefined number of dynamic triggers 146.

The process 300 starts at operation 302, where the server 102 is configured to receive communication feedback 104 from an entity 136*a* requesting to access network resources 178 in the communication network 210. At operation 304, the server 102 is configured to execute an ML algorithm 175 to determine one or more determined intents 144 based on the communication feedback 104. The ML algorithm 175 may, when executed, be configured to evaluate data in accordance with one or more ML models 176 to perform the one or more operations comprising determining the determined intents 144. At operation 306, the server 102 is configured to generate a synthetic network structure 154 and one or more dynamic triggers 146 based on the determined intents 144. The synthetic network structure 154 may be associated with the one or more dynamic triggers 146. At operation 308, the server 102 is configured to present access to the synthetic network structure 154 to the entity 136*a* in the communication network 210.

At operation 310, the server 102 is configured to determine whether the one or more entities 136 performed one or more actions 134 in association with the synthetic network structure 154. If the server 102 determines that the one or more entities 136 do not perform one or more actions 134 (and/or the one or more tracked activities 138) in association with the synthetic network structure 154 (e.g., NO), the process 300 proceeds to operation 322. The process 300 may conclude at operation 322, where the server 102 is configured to determine that the entity 136*a* is associated with a user device. If the server 102 determines that the one or more entities 136 perform one or more actions 134 (and/or the one or more tracked activities 138) in association with the synthetic network structure 154 (e.g., YES), the process 300 proceeds to operation 332. The server 102 may be configured to determine that the entity 136 performed one or more actions 134 associated with the synthetic network structure 154 in response to receiving the one or more dynamic triggers 146 from the communication network 210. At operation 332, the server 102 is configured to determine that the entity 136*a* is associated with one or more electronic attackers 118.

The process 300 may end at operation 334, where the server 102 may be configured to generate one or more reports comprising that the entity 136*a* is associated with the electronic attackers 118.

In some embodiments, the server 102 may be configured to train the one or more ML models 176 using the report. The server 102 may be configured to perform the process 300 for a same entity 136*a* multiple times over time and/or at many periods of time. The server 102 may be configured to generate one or more attack depictions 152 comprising a forensic map generated based on the interactions performed by the virtual entity 136*a* in the communication network 210. The server 102 may be configured to generate one or more attack depictions 152 comprising a forensic map generated based on the tracked activities 138 performed by the virtual entity 136*a* in the communication network 210. The server 102 may be configured to determine that some or all information associated with the entity 136*a* is added to a denylist 160. The server 102 may be configured to receive communication feedback 104 associated with one or more entities 136. In some embodiments, the server 102 may be configured to generate the synthetic network structures 154 as lure structures to be provided along access to one or more network resources 178 in the communication network 210. The synthetic network structures 154 and the one or more network resources 178 may be presented to the entity 136*a* in the divergent paths 260. In some embodiments, the synthetic network structures 154 may comprise a database comprising synthetic data (e.g., one or more synthetic data elements 164 representing one or more data elements). In other embodiments, the synthetic network structure 154 comprises access to one or more synthetic resources (e.g., one or more synthetic data elements 164 representing one or more processing resources, memory resources, and/or power resources).

Security Operations to Dynamically Generate Synthetic Structures in a Virtual Environment FIG. 4 shows multiple security operations 400 in which the system 100 of FIG. 1 is configured to dynamically generate synthetic structures (e.g., synthetic network structures 154) in one or more virtual environments 158, in accordance with one or more embodiments. In FIG. 4, the security operations 400 comprise multiple transitions 402-406 in a communication network 410. The security operations 400 may be performed between the server 102 and one or more entities 136 to determine whether the entities are one of more of the user devices 106 or one or more of the electronic attackers 118. The security operations 400 comprise the server 102 and at least one electronic attacker 118 communicatively coupled to one another in the communication network 410 via a connection 422 and a connection 424, respectively. In some embodiments, the electronic attacker 118*a* may be associated with a virtual entity 136*a*. The virtual entity 136*a* may enter the communication network 410 in a specific virtual direction 330. As time progresses, the virtual entity 136*a* may perform transitions 402-406 to interact with one or more network resources 178 and/or synthetic network structures. These network resources 178 may be a group of databases 442 and a group of undefined resources 444. The one or more synthetic network structures 154 may comprise synthetic databases 446 and synthetic databases 448 in a virtual environment 158*a* and synthetic databases 450 and a synthetic virtual device 452 in a virtual environment 158*b*.

In the communication network 410 of FIG. 4, the server 102 may be configured to receive communication feedback 104 comprising that the virtual entity 136*a* transitions to the databases 442 at a first time instance after a transition 402. Herein, the virtual entity 136*a* may be presented with one or more divergent paths (e.g., similar to divergent paths 260) at a second time instance. A first divergent path may comprise a transition 404 to interact with the undefined resources 444, a second divergent path may comprise another transition (not shown) to interact with the synthetic databases 446 and/or the synthetic databases 448 in the virtual environment 158*a*, and a third divergent path may comprise another transition (not shown) to interact with the synthetic databases 450 and/or the synthetic virtual device 452 in the virtual environment 158*b*. The communication feedback 104 received in association with the virtual entity 136*a* may be determined at determination 462 to have performed an attack 122*a* against the undefined resources 444. The undefined resources 444 may be one or more network resources 178 comprising one or more unstructured data elements. At this point, in response to receiving a dynamic trigger 146*a*, the virtual entity 136*a* is determined to be a virtual attacker 470 associated with the electronic attacker 118*a*. After a transition 406, the virtual attacker 470 may be determined to have performed an attack 122*b* to the synthetic databases 450 and an attack 122*c* to the synthetic virtual device 452. Further, in response to receiving the dynamic trigger 146*a*, the virtual attacker 270 is caused to perform the transition 406 into the virtual environment 158*b*. In the transition 406, the virtual attacker 470 may provide a synthetic element 164 (not shown) that is determined, after executing the ML algorithms 175, to lure the virtual attacker 470 into the virtual environment 158*b*.

In FIG. 4 the communication network 410 may be a portion of the network 110 comprising the databases 442, the undefined resources 444, the virtual environment 158*a*, and the virtual environment 158*b*. In some embodiments, one or more portions of the communication network 210 may be one or more attack depictions 152 representative of communication feedback 104 received by the server 102 from the network 110. In the example of FIG. 4, the virtual entity 136*a* is shown entering into one or more portions of the communication network 210 in the virtual direction 330. At transition 402, the virtual entity 136*a* is tracked approaching the one or more databases 442. At this stage, the server 102 may determine that it is undefined whether the virtual entity 136*a* is associated with the electronic attacker 118*a*. The virtual entity 136*a* may be presented with one or more divergent paths. A first divergent path may be presented to the virtual entity 136*a* to transition to real network resources 178. A second divergent path may be presented to the virtual entity 136*a* to transition to one or more synthetic network structures 154 assigning one or more dynamic triggers 146 to determine that the virtual entity 136*a* is associated with one or more user devices 106 or one or more electronic attackers 118. At transition 404, the virtual entity 136*a* moves to interact with the undefined resources 444. Herein, the virtual entity 136*a* attacks the undefined resources 444 via attack 122*a* (e.g., performing one or more unexpected interactions) causing the dynamic trigger 146*a* to be released at the server 102. The determination 462 may be representative of one or more authorization operations where the virtual entity 136*a* is determined to be associated with the electronic attacker 118*a*. After this point, the virtual entity 136*a* may be tracked as the virtual attacker 470 and any network resources 178 may be protected with additional safeguards to defend from direct interactions with the virtual attacker 470. At transition 406, the virtual attacker 470 is shown moving close to inspect the virtual environment 158*a*. Herein, the virtual entity 136*a* attacks the synthetic databases 450 via the attack 122*b* (e.g., performing one or more unexpected interactions) and/or the virtual device 452 via attack 122*c* (e.g., performing one or more unexpected interactions) in the virtual environment 158*b*. The virtual attacker 470 may be unable to leave the virtual environment 158*b* unless an organization and/or administrator enables the electronic attacker to exit the virtual attacker 470 from the virtual environment 158*b*.

Example Process to Dynamically Generate Synthetic Structures in a Virtual Environment FIG. 5 illustrates an example flowchart of a process 500 configured to dynamically generate synthetic structures (e.g., synthetic network structures 154) in a virtual environment 158. Modifications, additions, or omissions may be made to the process 500. The process 500 may comprise more, fewer, or other operations than those shown in FIG. 5. For example, operations may be performed in parallel or in any suitable order. While at times discussed as the server

102, the user devices 106, or components of any of thereof performing operations described in operations 502-532 in the process 500, any suitable system or components of the system 100 may perform one or more operations of the process 500. For example, one or more operations of the process 500 may be implemented, at least in part, in the form of instructions 132 of FIG. 1, stored on non-transitory, tangible, machine-readable media (e.g., a non-transitory computer-readable medium such as server memory 130 of FIG. 1) that when run by one or more processors (e.g., the processor 128 of FIG. 1) may cause the one or more processors to perform operations described in operations 502-532.

The server 102 may be configured to evaluate communication feedback 104 associated with one or more entities 136 (e.g., the entity 136*a*) and dynamically generate synthetic structures (e.g., synthetic network structures 154) in one or more virtual environments 158. Herein, the server 102 is configured to generating synthetic data to lure bad actors into forensic sandboxes (e.g., the one or more virtual environments 158). In particular, the server 102 may be configured to inject synthetic data (e.g., one or more synthetic elements 164 in one or more synthetic network structures 154) in the communication network 410 based on behavior associated with a virtual entity 136*a* attempting to access a secure network. The synthetic data may be generated to resemble sensitive data in the secure network after executing the one or more ML algorithms 175. As the server 102 determines that bad actors are trying to access a secure network, the server 102 may be configured to slowly provide the synthetic data to the bad actors as bait to lure them into the sandbox environments that are detached from the secure network and do not include sensitive data. The server 102 may be configured to dynamically generate the synthetic data based on communication feedback 104 received from the communication network 410 (e.g., behavior associated with the bad actor). For example, specific synthetic data may be generated to match a type of attack 122 started by the bad actors. In this regard, the synthetic data may be dynamically formatted and presented using a cognitive AI model (e.g., one or more of the ML models 176) to mimic the appearance of secured data that the bad actors expect to access. The behavior of the bad actors in the sandbox environment may be tracked and forensically analyzed to train the ML algorithms 175 and/or build up security/safety structures to prevent future attacks 122.

The process 500 starts at operation 502, where the server 102 receive multiple tracked activities 138 comprising one or more actions 134 performed by a virtual entity 136*a* in a communication network 410. At operation 504, the server 102 is configured to receive an access command 148 from the virtual entity 136*a* to access one or more network resources 178 in the communication network 410. At operation 506, the server 102 is configured to execute an ML algorithm 175 to determine a determined intent 144 based on the tracked activities 138 and the access command 148. At operation 508, the server 102 is configured to generate a synthetic network structure 154*a* (e.g., one of the synthetic network structures 154) based on the determined intent 144. The server 102 may be configured to generate the synthetic network structure 154*a* comprising one or more synthetic elements 164 configured to resemble the network resources 178. At operation 510, the server 102 is configured to generate a virtual environment 158*a* configured to resemble one or more portions of the communication network 410. The virtual environment 158*a* may be an isolated partition of the communication network 410. At operation 512, the server 102 is configured to place the synthetic network structure 154*a* in the virtual environment 158*a*. At operation 514, the server 102 is configured to present access to the synthetic network structure 154*a* to the virtual entity 136*a* in the communication network 410.

At operation 520, the server 102 is configured to determine whether the virtual entity 136*a* performed one or more actions 134 in association with the synthetic network structure 154*a*. If the server 102 determines that the virtual entity 136*a* does not perform one or more actions 134 in association with the synthetic network structure 154*a* (e.g., NO), the process 500 proceeds to operation 522. At operation 522, where the server 102 is configured to receive additional tracked activities 138 performed by the virtual entity 136*a* in the communication network 410. At operation 524, where the server 102 is configured to receive another access command 148 from the virtual entity 136*a*. If the server 102 determines that the virtual entity 136*a* performed one or more actions 134 in association with the synthetic network structure 154*a* (e.g., YES), the process 500 proceeds to operation 532. The server 102 may be configured to determine that the virtual entity 136*a* is associated with an electronic attacker 118*a* over a period of time.

The process 500 may end at operation 534, where the server 102 may be configured to enclose the virtual entity 136*a* in the virtual environment 158*a*. In some embodiments, the server 102 may be configured to generate a report comprising that the virtual entity 136*a* is associated with the electronic attacker 118*a* over the period of time. Further, the server 102 may be configured to train the one or more ML models 176 using the report. The server 102 may be configured to add any information collected in association with the virtual entity 136*a* to a denylist 160. The server 102 may be configured to generate one or more forensic maps (e.g., one or more of the attack depictions 152) is generated to include the actions from the virtual entity 136*a* associated with the electronic attacker 118*a*. The server 102 may be configured to allow access to the one or more forensic maps to one or more organizations (e.g., law enforcement organizations). The synthetic network structure 154*a* may be a database comprising one or more synthetic elements 164 comprising synthetic data.

Security Operations to Evaluate Entity Operations Across Multiple Virtual Environments FIG. 6 shows multiple security operations 600 in which the system 100 of FIG. 1 is configured to evaluate entity operations (e.g., the actions 134) across multiple virtual environments 158, in accordance with one or more embodiments. In FIG. 6, the security operations 600 comprise multiple transitions 602-608 in a communication network 610. The security operations 600 may be performed between the server 102 and one or more entities 136 to determine whether the entities are one of more of the user devices 106 or one or more of the electronic attackers 118. The security operations 600 comprise the server 102, an electronic attacker 118*a*, and an electronic attacker 118*b* communicatively coupled to one another in the communication network 610 via a connection 622, a connection 624, and a connection 626, respectively. In some embodiments, the electronic attacker 118*a* may be associated with a virtual attacker 630 and the electronic attacker 118*b* may be associated with a virtual attacker 632. The virtual attacker 630 may enter the communication network 610 in a specific virtual direction 634. As time progresses, the virtual attacker 630 may perform transitions 602-608 to interact with one or more synthetic network structures 154 configured to resemble one or more network resources 178 in the virtual environments

158*a*-158*c*. The one or more synthetic network structures 154 may be placed in a virtual environment 158*a*, a virtual environment 158*b*, and a virtual environment 158*c*. The virtual attacker 632 may enter the communication network 610 in a specific virtual direction 636. As time progresses, the virtual attacker 632 may not perform any transitions to interact with one or more synthetic network structures 154 configured to resemble one or more network resources 178 in the virtual environments 158*a*-158*c*. The virtual environments 158*a*-158*c* may be configured to comprise one or more of the synthetic network structures 154 shown in FIG. 6.

In the communication network 610 of FIG. 2, the server 102 may be configured to receive communication feedback 104 comprising that the virtual attacker 630 transitions to synthetic databases 640 and synthetic databases 642 in the virtual environment 158*a* at a first time instance after a transition 602. Herein, the virtual attacker 630 is presented with one or more divergent paths 650 at a second time instance. A first divergent path may comprise a transition 604 to interact with one or more synthetic resources 660 and a second divergent path may comprise a transition 606 to interact with a synthetic user device 670 in the virtual environment 158*c*. In the virtual environment 158*a*, the virtual attacker 630 is determined to have performed an attack 122*a* to the synthetic databases 642. After a transition 604, the virtual attacker 630 may be determined to inspect the virtual environment 158*b* at a third time. The communication feedback 104 received in association with the virtual attacker 630 may be determined to transition via a transition 608 to another area of the communication network 210 in the virtual environment 158*c*. In the virtual environment 158*c*, the virtual attacker 630 is determined to have performed an attack 122*c* to a simulation 672 comprising the synthetic user device 670. Further, in the virtual environment 158*c*, the virtual attacker 632 is determined to have performed an attack 122*d* to synthetic databases 676. Further, the virtual attacker 630 and the virtual attacker 632 may interact with one another via an interaction 680.

In one or more embodiments, the communication network 610 may be a portion of the network 110 partitioned to isolate the virtual environment 158*a*, the virtual environment 158*b*, and the virtual environment 158*c* from the rest of the network 110. In some embodiments, one or more portions of the communication network 610 may be one or more attack depictions 152 representative of communication feedback 104 received by the server 102 from the network 110.

Example Process to Evaluate Entity Operations Across Multiple Virtual Environments FIG. 7 illustrates an example flowchart of a process 700 configured to evaluate entity operations (e.g., the actions 134) across multiple virtual environments 158, in accordance with one or more embodiments. Modifications, additions, or omissions may be made to the process 700. The process 700 may comprise more, fewer, or other operations than those shown in FIG. 7. For example, operations may be performed in parallel or in any suitable order. While at times discussed as the server 102, the user devices 106, or components of any of thereof performing operations described in operations 702-734 in the process 700, any suitable system or components of the system 100 may perform one or more operations of the process 700. For example, one or more operations of the process 700 may be implemented, at least in part, in the form of instructions 132 of FIG. 1, stored on non-transitory, tangible, machine-readable media (e.g., a non-transitory computer-readable medium such as server memory 130 of FIG. 1) that when run by one or more processors (e.g., the processor 128 of FIG. 1) may cause the one or more processors to perform operations described in operations 702-734.

The server 102 may be configured to evaluate communication feedback 104 associated with one or more entities 136 (e.g., the entity 136*a*) and evaluate entity operations (e.g., the actions 134) across multiple virtual environments 158. Herein, the server 102 is configured to generate and extend multiple forensic sandboxes (e.g., one or more virtual environments 158*a*-158*c*) across multiple layers and/or organizations. In particular, the server 102 may be configured to execute one or more ML algorithms 175 to create multiple sandboxes containing synthetic data (e.g., one or more synthetic network structures 154 comprising one or more synthetic elements 164) provided to bad actors and associating these sandbox environments to one another to create a sandbox network. The sandbox environments may be containerized environments (e.g., isolated environments) in which bad actors are kept away from sensitive information in the rest of the network 110. In these sandbox environments 158, the bad actors may think that they are infiltrating a secure network while their behavior is tracked in the virtual environments 158. The sandbox environments may be extensions of a local sandbox environment and/or standalone sandbox environments that are associated with each other via communications of one or more bad actors. The sandbox environments may be dynamically analyzed by cognitive AI (e.g., via one or more ML models 176) to track and understand bad actor behavior across multiple platforms. In this regard, the actions 134 of the bad actors may be mapped over multiple sandbox environments to create a cohesive picture of their operations. For example, certain bad actors may attempt to access sensitive information from multiple networks (other than the network 110). As these bad actors are identified to be related to one another, the server 102 may be configured to generate a sandbox network that enables different actions of the bad actors to be shared across sandbox environments such that the virtual environments 158 in the network 110 are joined with virtual environments 158 in other networks. In another example, after a period of time and/or after crossing an adverse impact level threshold (e.g., one or more of the thresholds 142), the server 102 may be configured to access monitoring of a local sandbox environment to a government enforcement entity.

The process 700 starts at operation 702, where the server 102 is configured to receive multiple tracked activities 138 comprising one or more actions 134 performed by an entity 136*a* in a virtual environment 158*a* over a period of time. The entity 136*a* may be previously determined to be the virtual attacker 630. The virtual environment 158*a* may be an isolated partition of a communication network 610. At operation 704, the server 102 is configured to execute an ML algorithm 175 configured to determine at least one determined intent 144 based on the tracked activities 138. In some embodiments, one determined intent may be determined based on analyses of a single tracked activity 138. Further, one determined intent 144 may be determined based on analyses of multiple tracked activities 138. At operation 706, the server 102 is configured to generate synthetic network structures 154 based on the determined intents 144. The synthetic network structures 154 may comprise one or more synthetic elements 164 configured to resemble one or more network resources 178. At operation 708, the server 102 is configured to assign adverse impacts 140 to the synthetic network structures 154. At operation 710, the server 102 is configured to place the synthetic network structures 154 in the virtual environment 158*a*. The server 102 may be configured to place the synthetic network structure 154*s* in one or more virtual environments 158.

At operation 710, the server 102 is configured to determine whether the virtual attacker 630 performed any additional actions 134. If the server 102 determines that the virtual attacker 630 does not perform one or more actions 134 in association with the synthetic network structure 154 (e.g., NO), the process 700 proceeds to operation 722. At operation 722, the server 102 is configured to receive additional tracked activities 138 performed by the virtual attacker 630 in the virtual environment 158*a*. If the server 102 determines that the virtual attacker 630 performed one or more actions 134 in association with the synthetic network structure 154 (e.g., YES), the process 700 proceeds to operation 732. At operation 732, the server 102 is configured to determine that the virtual attacker 630 performed a specific action 134 in association with a specific synthetic network structure 154.

The process 700 may end at operation 734, where the server 102 may be configured to generate a report comprising that the virtual attacker 630 is associated with the adverse impact 140 corresponding to a given synthetic network structure 154 over the period of time. In some embodiments, the server 102 may be configured to train the one or more ML models 176 using the report. The server 102 may be configured to generate an attacker profile associated with the virtual attacker 630. There may be one or more operations tracked over time.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:

a memory operable to store:

a machine learning algorithm configured, when executed, to analyze data in accordance with one or more machine learning models; and at least one processor communicatively coupled to the memory and configured to:

receive a first plurality of tracked activities comprising one or more actions performed by a first entity in a communication network over a first period of time;

receive a first access command from the first entity to access a first plurality of network resources in the communication network;

execute the machine learning algorithm to:

determine a first determined intent based on the first plurality of tracked activities and the first access command, wherein the first determined intent comprises a predicted future behavior that the first entity is expected to perform in the communication network, and wherein the predicted future behavior is determined by the machine learning algorithm analyzing both the first plurality of tracked activities and the first access command in combination to predict network resources the first entity is expected to attempt to access;

generate a first synthetic network structure based on the first determined intent, the first synthetic network structure comprising a first plurality of synthetic elements configured to resemble the first plurality of network resources;

generate a first virtual environment configured to resemble one or more portions of the communication network, the first virtual environment being an isolated partition of the communication network; and place the first synthetic network structure in the first virtual environment;

present, to the first entity, access to the first synthetic network structure in the first virtual environment;

determine whether the first entity performed a first action in association with the first synthetic network structure;

in response to determining that the first entity performed the first action in association with the first synthetic network structure, determine that the first entity is associated with a first electronic attacker over the first period of time;

enclose the first entity in the first virtual environment such that the first entity is unable to access network resources from the rest of the communication network;

generate a first report comprising that the first entity is associated with the first electronic attacker over the first period of time; and train the one or more machine learning models using the first report.

2. The system of claim 1, wherein the at least one processor is further configured to:

receive a second plurality of tracked activities comprising one or more additional actions performed by the first entity in the first virtual environment over a second period of time;

execute the machine learning algorithm to:

determine a second determined intent based on the second plurality of tracked activities;

generate a second synthetic network structure based on the second determined intent, the second synthetic network structure comprising a second plurality of synthetic elements configured to resemble a second plurality of network resources; and place the second synthetic network structure in the first virtual environment;

present, to the first entity, access to the second synthetic network structure in the first virtual environment;

determine whether the first entity interacted with the second synthetic network structure;

in response to determining that the first entity interacted with the second synthetic network structure, determine that the first entity is associated with the first electronic attacker over the second period of time;

generate a second report comprising that the first entity is associated with the first electronic attacker over the second period of time; and train the one or more machine learning models using the second report.

3. The system of claim 1, wherein the at least one processor is further configured to:

receive a second plurality of tracked activities comprising one or more additional actions performed by the first entity in the first virtual environment over a second period of time;

execute the machine learning algorithm to:

determine a second determined intent based on the first plurality of tracked activities and the second plurality of tracked activities;

generate a second synthetic network structure based on the second determined intent, the second synthetic network structure comprising a second plurality of synthetic elements configured to resemble a second plurality of network resources; and place the second synthetic network structure in the first virtual environment;

present, to the first entity, access to the second synthetic network structure in the first virtual environment;

determine whether the first entity interacted with the second synthetic network structure;

in response to determining that the first entity interacted with the second synthetic network structure, determine that the first entity is associated with the first electronic attacker over the second period of time;

generate a second report comprising that the first entity is associated with the first electronic attacker over the second period of time; and train the one or more machine learning models using the second report.

4. The system of claim 3, wherein the at least one processor is further configured to:

in response to generating the second report, provide information associated with the first entity to a denylist.

5. The system of claim 3 wherein the at least one processor is further configured to:

determine a first plurality of entity actions based on the first plurality of tracked activities;

in response to generating the first report, associate the first plurality of entity actions with a first position in an attack depiction comprising the first synthetic network structure;

determine a second plurality of entity actions based on the second plurality of tracked activities; and in response to generating the second report, associate the second plurality of entity actions with a second position in the attack depiction.

6. The system of claim 5, wherein the at least one processor is further configured to:

provide access of the attack depiction to a law enforcement organization.

7. The system of claim 1, wherein the at least one processor is further configured to:

receive a second plurality of tracked activities comprising one or more additional actions performed by a second entity in the communication network over a second period of time;

receive a second access command from the second entity to access a second plurality of network resources in the communication network;

execute the machine learning algorithm to:

determine a second determined intent based on the second plurality of tracked activities and the second access command;

generate a second synthetic network structure based on the second determined intent, the second synthetic network structure comprising a second plurality of synthetic elements configured to resemble the second plurality of network resources;

generate a second virtual environment configured to resemble one or more additional portions of the communication network, the second virtual environment being another isolated partition of the communication network; and place the second synthetic network structure in the second virtual environment;

present, to the second entity, access to the second synthetic network structure in the second virtual environment;

determine whether the second entity performed a second action in association with the second synthetic network structure;

in response to determining that the second entity performed the second action in association with the second synthetic network structure, determine that the second entity is associated with a second electronic attacker over the second period of time;

generate a second report comprising that the second entity is associated with the second electronic attacker over the second period of time; and train the one or more machine learning models using the second report.

8. The system of claim 1, wherein:

the first synthetic network structure is a database; and the first plurality of synthetic elements comprise synthetic data.

9. A method, comprising:

receiving a first plurality of tracked activities comprising one or more actions performed by a first entity in a communication network over a first period of time;

receiving a first access command from the first entity to access a first plurality of network resources in the communication network;

executing a machine learning algorithm configured, when executed, to analyze data in accordance with one or more machine learning models to perform one or more operations comprising:

determining a first determined intent based on the first plurality of tracked activities and the first access command;

generating a first synthetic network structure based on the first determined intent, the first synthetic network structure comprising a first plurality of synthetic elements configured to resemble the first plurality of network resources;

generating a first virtual environment configured to resemble one or more portions of the communication network, the first virtual environment being an isolated partition of the communication network; and placing the first synthetic network structure in the first virtual environment;

presenting, to the first entity, access to the first synthetic network structure in the first virtual environment;

determining whether the first entity performed a first action in association with the first synthetic network structure;

in response to determining that the first entity performed the first action in association with the first synthetic network structure, determining that the first entity is associated with a first electronic attacker over the first period of time;

generating a first report comprising that the first entity is associated with the first electronic attacker over the first period of time; and training the one or more machine learning models using the first report.

10. The method of claim 9, further comprising:

receiving a second plurality of tracked activities comprising one or more additional actions performed by the first entity in the first virtual environment over a second period of time;

executing the machine learning algorithm to perform one or more additional operations comprising:

determining a second determined intent based on the second plurality of tracked activities;

generating a second synthetic network structure based on the second determined intent, the second synthetic network structure comprising a second plurality of synthetic elements configured to resemble a second plurality of network resources; and placing the second synthetic network structure in the first virtual environment;

presenting, to the first entity, access to the second synthetic network structure in the first virtual environment;

determining whether the first entity interacted with the second synthetic network structure;

in response to determining that the first entity interacted with the second synthetic network structure, determining that the first entity is associated with the first electronic attacker over the second period of time;

generating a second report comprising that the first entity is associated with the first electronic attacker over the second period of time; and training the one or more machine learning models using the second report.

11. The method of claim 9, further comprising:

receiving a second plurality of tracked activities comprising one or more additional actions performed by the first entity in the first virtual environment over a second period of time;

executing the machine learning algorithm to perform one or more additional operations comprising:

determining a second determined intent based on the first plurality of tracked activities and the second plurality of tracked activities;

generating a second synthetic network structure based on the second determined intent, the second synthetic network structure comprising a second plurality of synthetic elements configured to resemble a second plurality of network resources; and placing the second synthetic network structure in the first virtual environment;

presenting, to the first entity, access to the second synthetic network structure in the first virtual environment;

determining whether the first entity interacted with the second synthetic network structure;

in response to determining that the first entity interacted with the second synthetic network structure, determining that the first entity is associated with the first electronic attacker over the second period of time;

generating a second report comprising that the first entity is associated with the first electronic attacker over the second period of time; and training the one or more machine learning models using the second report.

12. The method of claim 11, further comprising:

in response to generating the second report, providing information associated with the first entity to a denylist.

13. The method of claim 11, further comprising:

determining a first plurality of entity actions based on the first plurality of tracked activities;

in response to generating the first report, associating the first plurality of entity actions with a first position in an attack depiction comprising the first synthetic network structure;

determining a second plurality of entity actions based on the second plurality of tracked activities; and in response to generating the second report, associating the second plurality of entity actions with a second position in the attack depiction.

14. The method of claim 13, further comprising:

providing access of the attack depiction to a law enforcement organization.

15. The method of claim 9, further comprising:

receive a second plurality of tracked activities comprising one or more additional actions performed by a second entity in the communication network over a second period of time;

receive a second access command from the second entity to access a second plurality of network resources in the communication network;

execute the machine learning algorithm to:

determine a second determined intent based on the second plurality of tracked activities and the second access command;

generate a second synthetic network structure based on the second determined intent, the second synthetic network structure comprising a second plurality of synthetic elements configured to resemble the second plurality of network resources;

generate a second virtual environment configured to resemble one or more additional portions of the communication network, the second virtual environment being another isolated partition of the communication network; and place the second synthetic network structure in the second virtual environment;

present, to the second entity, access to the second synthetic network structure in the second virtual environment;

determine whether the second entity performed a second action in association with the second synthetic network structure;

in response to determining that the second entity performed the second action in association with the second synthetic network structure, determine that the second entity is associated with a second electronic attacker over the second period of time;

generate a second report comprising that the second entity is associated with the second electronic attacker over the second period of time; and train the one or more machine learning models using the second report.

16. A non-transitory computer-readable medium storing instructions that when executed by a processor cause the processor to:

receive a first plurality of tracked activities comprising one or more actions performed by a first entity in a communication network over a first period of time;

receive a first access command from the first entity to access a first plurality of network resources in the communication network;

execute a machine learning algorithm configured, when executed, to analyze data in accordance with one or more machine learning models to:

determine a first determined intent based on the first plurality of tracked activities and the first access command;

generate a first synthetic network structure based on the first determined intent, the first synthetic network structure comprising a first plurality of synthetic elements configured to resemble the first plurality of network resources;

generate a first virtual environment configured to resemble one or more portions of the communication network, the first virtual environment being an isolated partition of the communication network; and place the first synthetic network structure in the first virtual environment;

present, to the first entity, access to the first synthetic network structure in the first virtual environment;

determine whether the first entity performed a first action in association with the first synthetic network structure;

in response to determining that the first entity performed the first action in association with the first synthetic network structure, determine that the first entity is associated with a first electronic attacker over the first period of time;

generate a first report comprising that the first entity is associated with the first electronic attacker over the first period of time; and train the one or more machine learning models using the first report.

17. The non-transitory computer-readable medium of claim 16, wherein, when executed by the processor, the instructions further cause the processor to:

receive a second plurality of tracked activities comprising one or more additional actions performed by the first entity in the first virtual environment over a second period of time;

execute the machine learning algorithm to:

determine a second determined intent based on the second plurality of tracked activities;

generate a second synthetic network structure based on the second determined intent, the second synthetic network structure comprising a second plurality of synthetic elements configured to resemble a second plurality of network resources; and place the second synthetic network structure in the first virtual environment;

present, to the first entity, access to the second synthetic network structure in the first virtual environment;

determine whether the first entity interacted with the second synthetic network structure;

in response to determining that the first entity interacted with the second synthetic network structure, determine that the first entity is associated with the first electronic attacker over the second period of time;

generate a second report comprising that the first entity is associated with the first electronic attacker over the second period of time; and train the one or more machine learning models using the second report.

18. The non-transitory computer-readable medium of claim 16, wherein, when executed by the processor, the instructions further cause the processor to:

receive a second plurality of tracked activities comprising one or more additional actions performed by the first entity in the first virtual environment over a second period of time;

execute the machine learning algorithm to:

determine a second determined intent based on the first plurality of tracked activities and the second plurality of tracked activities;

generate a second synthetic network structure based on the second determined intent, the second synthetic network structure comprising a second plurality of synthetic elements configured to resemble a second plurality of network resources; and place the second synthetic network structure in the first virtual environment;

present, to the first entity, access to the second synthetic network structure in the first virtual environment;

determine whether the first entity interacted with the second synthetic network structure;

in response to determining that the first entity interacted with the second synthetic network structure, determine that the first entity is associated with the first electronic attacker over the second period of time;

generate a second report comprising that the first entity is associated with the first electronic attacker over the second period of time; and train the one or more machine learning models using the second report.

19. The non-transitory computer-readable medium of claim 18, wherein, when executed by the processor, the instructions further cause the processor to:

in response to generating the second report, provide information associated with the first entity to a denylist.

20. The non-transitory computer-readable medium of claim 18, wherein, when executed by the processor, the instructions further cause the processor to:

determine a first plurality of entity actions based on the first plurality of tracked activities;

in response to generating the first report, associate the first plurality of entity actions with a first position in an attack depiction comprising the first synthetic network structure;

determine a second plurality of entity actions based on the second plurality of tracked activities; and in response to generating the second report, associate the second plurality of entity actions with a second position in the attack depiction.

* * * * *